United States Patent [19]

Shustack

[11] Patent Number: 5,352,712
[45] Date of Patent: Oct. 4, 1994

[54] ULTRAVIOLET RADIATION-CURABLE COATINGS FOR OPTICAL FIBERS

[75] Inventor: Paul J. Shustack, West Chester, Ohio

[73] Assignee: Borden, Inc., Columbus, Ohio

[21] Appl. No.: 868,933

[22] Filed: Apr. 16, 1992

Related U.S. Application Data

[63] Continuation-in-part of Ser. No. 742,531, Aug. 8, 1991, Pat. No. 5,146,531, which is a continuation of Ser. No. 350,239, May 11, 1989, abandoned.

[51] Int. Cl.$^5$ ............... B32B 17/02; B32B 17/04; C08G 18/62; C08F 2/50
[52] U.S. Cl. ............... 522/31; 522/42; 522/44; 522/51; 522/75; 522/76; 522/77; 522/78; 522/79; 522/96; 522/98; 522/134; 522/135; 522/136; 522/137; 522/141; 522/142; 522/143; 522/144; 522/146; 428/378; 385/123
[58] Field of Search ............... 522/96, 90, 31, 42, 522/75, 98, 44, 51, 76, 77, 78, 79, 134, 135, 136, 137, 141, 142, 143, 144, 146; 528/65

[56] References Cited

U.S. PATENT DOCUMENTS

| | | | |
|---|---|---|---|
| Re. 29,131 | 2/1977 | Smith et al. | 260/77.5 AN |
| 3,655,625 | 4/1972 | Thomas | 528/45 |
| 3,678,014 | 7/1972 | Suzuki et al. | 260/77.5 CR |
| 3,855,379 | 12/1974 | Araki et al. | 260/77.5 CR |
| 3,912,516 | 10/1975 | Recchia et al. | 430/271 |
| 3,980,390 | 9/1976 | Yamamoto et al. | 385/128 |
| 3,981,978 | 9/1976 | Crivello et al. | 260/440 |
| 4,001,015 | 1/1977 | Barzynski et al. | 430/302 |
| 4,004,997 | 1/1977 | Tsukamoto et al. | 522/81 |
| 4,020,125 | 4/1977 | Suzuki et al. | 260/859 R |
| 4,023,978 | 5/1977 | Imaizumi et al. | 430/286 |
| 4,082,634 | 4/1978 | Chang | 204/159.15 |
| 4,088,498 | 5/1978 | Faust | 96/115 P |
| 4,100,318 | 7/1978 | McCann et al. | 428/159 |
| 4,105,284 | 8/1978 | Olshansky | 385/127 |
| 4,112,017 | 9/1978 | Howard | 260/859 R |
| 4,120,721 | 10/1978 | Ketley et al. | 430/284 |
| 4,125,544 | 11/1978 | Ketley et al. | 427/498 |
| 4,131,602 | 12/1978 | Hodakowski et al. | 528/49 |
| 4,133,723 | 1/1979 | Howard | 427/519 |
| 4,137,081 | 1/1979 | Pohl | 430/271 |
| 4,174,307 | 11/1979 | Rowe | 204/159.19 |
| 4,188,455 | 2/1980 | Howard | 428/423.1 |
| 4,192,684 | 3/1980 | Gensho et al. | 430/284 |
| 4,210,713 | 7/1980 | Sumiyoshi et al. | 522/96 |
| 4,214,955 | 7/1980 | Rowe | 522/96 |
| 4,234,399 | 11/1980 | McDowell et al. | 522/18 |
| 4,243,793 | 1/1981 | Williams | 528/75 |
| 4,295,909 | 10/1981 | Baccei | 522/91 |
| 4,324,575 | 4/1982 | Levy | 65/3.11 |
| 4,344,982 | 8/1982 | Chen | 427/506 |
| 4,353,980 | 10/1982 | Helling et al. | 430/532 |

(List continued on next page.)

FOREIGN PATENT DOCUMENTS 1236623 5/1988 Canada.

(List continued on next page.)

OTHER PUBLICATIONS

Derwent Abstract of JP-A-2 047 119 (Nisso Maruzen Chem) Aug. 1988.

(List continued on next page.)

Primary Examiner—Susan W. Berman
Attorney, Agent, or Firm—Roylance, Abrams, Berdo & Goodman

[57] ABSTRACT

Ultraviolet radiation-curable primary and secondary coating compositions for optical fibers are disclosed. The primary coatings comprise a hydrocarbon polyol-based reactively terminated aliphatic urethane oligomer; a hydrocarbon monomer terminated with at least one end group capable of reacting with the terminus of the oligomer; and an optional photoinitiator. The secondary coatings comprise a polyester and/or polyether-based aliphatic urethane reactively terminated oligomer; a hydrocarbonaceous viscosity-adjusting component capable of reacting with the reactive terminus of (I); and an optional photoinitiator. Also disclosed are optical fibers coated with the secondary coating alone or with the primary and secondary coatings of the invention.

50 Claims, No Drawings

U.S. PATENT DOCUMENTS

| | | | |
|---|---|---|---|
| 4,377,458 | 3/1983 | Watanabe | 522/33 |
| 4,377,679 | 3/1983 | Schmidle | 528/75 |
| 4,396,645 | 8/1983 | Kimura et al. | 427/163 |
| 4,416,750 | 11/1983 | Murphy et al. | 522/92 |
| 4,439,600 | 3/1984 | Moran, Jr. | 528/392 |
| 4,451,523 | 5/1984 | Nativi et al. | 428/209 |
| 4,455,401 | 6/1984 | Son et al. | 524/91 |
| 4,461,093 | 11/1984 | Murphy et al. | 522/79 |
| 4,472,019 | 9/1984 | Bishop et al. | 350/96.3 |
| 4,474,830 | 10/1984 | Taylor | 427/513 |
| 4,474,855 | 10/1984 | Brixius et al. | 428/425.8 |
| 4,477,548 | 10/1984 | Harasta et al. | 430/14 |
| 4,496,686 | 1/1985 | Ansel | 522/96 |
| 4,499,163 | 2/1985 | Ishimaru et al. | 430/5 |
| 4,507,458 | 3/1985 | Shiraki et al. | 528/49 |
| 4,512,340 | 4/1985 | Buck | 522/8 |
| 4,514,037 | 4/1985 | Bishop et al. | 385/128 |
| 4,522,465 | 6/1985 | Bishop et al. | 385/128 |
| 4,525,258 | 6/1985 | Watanabe et al. | 522/14 |
| 4,533,445 | 8/1985 | Orio | 522/92 |
| 4,547,478 | 10/1985 | Chang | 502/154 |
| 4,572,610 | 2/1986 | Krajewski | 350/96.34 |
| 4,585,534 | 4/1986 | Pasternack et al. | 522/31 |
| 4,587,201 | 5/1986 | Morikawa et al. | 430/284 |
| 4,599,274 | 7/1986 | Ando et al. | 428/442 |
| 4,600,649 | 7/1986 | Leo | 428/412 |
| 4,603,064 | 7/1986 | Kania | 427/407.1 |
| 4,608,400 | 8/1986 | Yokoshima et al. | 522/96 |
| 4,608,409 | 8/1986 | Coady et al. | 522/95 |
| 4,609,718 | 9/1986 | Bishop et al. | 528/49 |
| 4,624,994 | 11/1986 | Ansel | 525/440 |
| 4,629,287 | 12/1986 | Bishop | 385/141 |
| 4,657,354 | 4/1987 | Kobayashi | 359/718 |
| 4,659,788 | 4/1987 | Ohta et al. | 522/94 |
| 4,672,001 | 6/1987 | Bravet et al. | 428/425.6 |
| 4,682,850 | 7/1987 | White et al. | 350/96.23 |
| 4,682,851 | 7/1987 | Ansel | 385/141 |
| 4,690,502 | 9/1987 | Zimmerman et al. | 385/141 |
| 4,690,503 | 9/1987 | Janssen et al. | 350/96.30 |
| 4,707,076 | 11/1987 | Shutnik et al. | 522/172 |
| 4,717,739 | 1/1988 | Chevreux et al. | 522/79 |
| 4,720,529 | 1/1988 | Kimura et al. | 528/65 |
| 4,733,941 | 3/1988 | Broer et al. | 385/127 |
| 4,734,333 | 3/1988 | Leo et al. | 522/90 |
| 4,741,597 | 5/1988 | Broer | 385/141 |
| 4,751,273 | 6/1988 | Lapin et al. | 525/455 |
| 4,758,447 | 7/1988 | Broer et al. | 427/513 |
| 4,761,363 | 8/1988 | Hung et al. | 430/284 |
| 4,780,486 | 10/1988 | Lee et al. | 522/14 |
| 4,783,544 | 11/1988 | Yokoshima et al. | 522/96 |
| 4,786,586 | 11/1988 | Lee et al. | 430/532 |
| 4,789,625 | 12/1988 | Ellerstein et al. | 430/372 |
| 4,804,928 | 2/1989 | Rousseau | 560/26 |
| 4,806,574 | 2/1989 | Krajewski | 522/96 |
| 4,849,462 | 7/1989 | Bishop | 522/97 |
| 4,962,992 | 10/1990 | Chapin et al. | 350/96.23 |
| 4,973,611 | 11/1910 | Puder | 522/42 |
| 4,981,881 | 1/1991 | Crivello et al. | 522/31 |
| 5,139,872 | 8/1992 | Lapin et al. | 522/90 |
| 5,199,098 | 3/1993 | Nolan et al. | 385/128 |
| 5,229,433 | 7/1993 | Schunck et al. | 522/96 |

FOREIGN PATENT DOCUMENTS

| | | |
|---|---|---|
| 0104057 | 3/1984 | European Pat. Off. . |
| 0111280 | 6/1984 | European Pat. Off. . |
| 0149741 | 7/1985 | European Pat. Off. . |
| 0153520 | 9/1985 | European Pat. Off. . |
| 0209641 | 1/1987 | European Pat. Off. . |
| 0336653 | 10/1989 | European Pat. Off. . |
| 6291519 | 6/1980 | Japan . |
| 60-118759 | 6/1985 | Japan . |
| WO9002614 | 3/1990 | PCT Int'l Appl. . |
| WO9013523 | 4/1990 | PCT Int'l Appl. . |
| WO9204388 | 6/1991 | PCT Int'l Appl. . |

OTHER PUBLICATIONS

Schorhon et al., J. of Applied Polymer Science, vol. 23, No. 1, Jan. 1, 1979, pp. 75–84.
Union Carbide Article, Silicones, Organofunctional Silanes-A Profile, pp. 3–9.
Cargill Product Information 15-1512, Radiation Curable Resin.
New Oligomers: Low Polarity Low Permeability Urethane Acrylates with Hydrocarbon Backbones, Ellerstein et al., pp. 6–10/6–18.

ULTRAVIOLET RADIATION-CURABLE COATINGS FOR OPTICAL FIBERS

BACKGROUND OF THE INVENTION

This application is a continuation-in-part of U.S. Ser. No. 742,531, filed Aug. 8, 1991, now U.S. Pat. No. 5,146,531, issued Sep. 8, 1992 which is in turn a continuation of U.S. Ser. No. 350,239, filed May 11, 1989, now abandoned.

COATED OPTICAL FIBERS IN GENERAL

The present invention relates to radiation-curable primary and secondary coatings for optical fibers and to optical fibers containing such coatings.

Until recently, the optical fiber industry was concentrated on so-called "long haul" applications, wherein optical fibers were used to traverse long distances such as in transoceanic or transcontinental cables. In such applications, optical fibers required shielding with voluminous protective cabling material in sheltered subterranean or submarine environments and thus were not directly exposed to environmental hazards.

A recent trend in the optical fiber market is in local area networks for fiber-to-the-home uses. The fibers in such uses are directly exposed to much harsher conditions than previous applications of glass fibers, including severe temperature and humidity extremes. Consequently, previously used coatings did not perform well under such adverse conditions; hence, a need existed for the development of higher performance coatings. Such coatings needed to be able to withstand the above conditions, i.e., to possess thermal, oxidative and hydrolytic stability, and to protect the fiber over the long term, i.e., over twenty-five years' time.

Optical fibers used for light transmission can be prepared which, immediately after drawing, are exceptionally strong and have very few intrinsic defects. However, such pristine fibers are very easily flawed by exposure to environmental conditions including dust and moisture. Even a small flaw can reduce the strength of a fiber by an order of magnitude, rendering it brittle and easily broken by a weak external forces. Therefore, optical glass fibers have, in the prior art, been clad with at least one resin coat immediately after their preparation, whose minimum requirement is to protect the underlying pristine fiber from such external forces.

Typically, at least two coatings, a primary, or buffer, coating and a secondary coating, have been used. The inner, or primary, coating is applied directly to the glass fiber and, when cured, forms a soft, rubbery, compliant material which serves as a buffer to cushion and protect the fiber by relieving the stresses created when the fiber is bent, cabled or spooled. Such stress might otherwise induce microbending of the fibers and cause attenuation of the light traveling through them, resulting in inefficient signal transmission. The secondary coating is applied over the primary coating, and must function as a hard, tough protective outer layer preventing damage to the glass fiber during processing and use.

PRIMARY COATING

Certain characteristics are desirable for the primary coating, and others for the secondary coating. For example, the primary coating must maintain adequate adhesion to the glass fiber during thermal and hydrolytic aging, yet be strippable therefrom for splicing purposes. The tensile modulus of the primary coating must be low to cushion and protect the fiber by readily relieving the stresses on the fiber which can induce microbending and consequent inefficient signal transmission. This cushioning effect must be maintained through the temperature range in which the fibers may be exposed throughout their lifetime. Thus, it is necessary for the primary coating to have a low glass transition temperature (Tg). This low glass transition temperature will ensure that the coating remains in its rubbery state throughout the possible use temperature range.

The primary coating should also have a relatively high refractive index, i.e., greater than that of the cladding material of the fiber to be coated. This high refractive index allows for a refractive index differential between the glass cladding and the primary coating. This differential allows errant light signals to be refracted away from the glass core.

Another requisite quality of the primary (buffer) coating is resistance to moisture. Moisture will rapidly degrade the strength of the coating itself as well as the underlying glass fibers under stress. The reaction is one of hydrolysis and stress corrosion. Moisture will also adversely affect the adhesion of the primary (buffer) coating to the glass, resulting in possible delamination. It is therefore desirable for the coating to be as hydrophobic as possible. Preferably, the primary coating should have a water absorption value of less than 5% by weight, and more preferably less than 2.5% by weight.

SECONDARY COATING

Similarly, the secondary coating must have a number of essential and optimal qualities. The secondary coating must function as a hard protective layer which allows the fiber not to be damaged during its processing and use. Consequently, this secondary coating should have a relatively high glass transition temperature (Tg), i.e., about 50° C., and a high tensile modulus, i.e., about 100,000 psi at 25° C. It is desirable for the secondary coating to have a Tg higher than its highest use temperature, because at or near the Tg of a polymer, many physical properties such as modulus, tensile strength, thermal expansion coefficient, moisture absorptivity, and so forth, change dramatically with small changes in temperature. This results in large changes in the fiber characteristics.

Furthermore, like the primary coating, the secondary coating should undergo minimal changes in physical properties on exposure to moisture. Many polymeric coating materials experience significant hydrolysis, plasticization, softening, and loss of protective function in the presence of water. Therefore, it is desirable that the secondary coating should also be as hydrophobic as possible. A hydrophobic secondary coating also enhances the ability of the primary coating to keep water away from the glass fiber itself, and thus inhibits moisture induced hydrolysis and stress corrosion of the glass fiber.

Also, the secondary coating must have a high refractive index, i.e., preferably higher than that of the cladding material of the glass fiber, to enable it to strip out errant light, as with the primary coating, especially in embodiments where the primary coating is omitted.

Another important property of secondary coatings is the coefficient of friction (COF). A low COF facilitates winding and unwinding of the fibers on spools. It also allows the fibers to slide easily along each other in a cable structure, thus relieving stress. However, if the COF is too low, the fibers will have a reduced tendency to stay aligned on the spool. The COF is largely determined by the cure properties of the secondary coating; if the coating has a good hard surface cure, its COF will tend to be low. Various slip additives can be added to lower the COF; however, deleterious effects such as surface tension problems, contamination, volatilization and blooming may result from their use.

DESIRABLE FEATURES FOR BOTH COATINGS

Still other desirable properties exist which apply to both the primary and secondary coatings. For example, fiber manufacturers are motivated to coat the fibers as rapidly as possible to attain the economy of faster cure speeds, as these result in higher line speeds. The cure speeds of coating materials may be determined by constructing a UV dose versus modulus curve. The lowest UV dose at which the coating modulus exhibits dose independence is considered its cure speed. There is therefore a demand for faster curing coatings; for example, high line speeds are obtained with primary and secondary coatings which may be applied wet-on-wet and simultaneously ultraviolet light-cured. One way of doing this is described in U.S. Pat. No. 4,474,830, issued Oct. 2, 1984 to Carl R. Taylor, which patent is expressly incorporated herein by reference.

According to this patent, an optical fiber is passed through a coating applicator comprising first and second dies. The first die confines a first coating liquid over a portion of the fiber's length. A second coating liquid is applied onto the fiber through a clearance between the first and second dies. The clearance is sufficiently small so that substantially no recirculation of the second coating liquid occurs in the vicinity of the point of application to the fiber. The second coating liquid is preferably applied at a free surface; that is, it is not in contact with either the first or second dies in the immediate vicinity of the point of application to the fiber. Additional coatings can be applied in a similar manner.

Another desirable objective for both primary and secondary UV-curable coatings is to minimize the amount of unbound material in the coating after cure. Even when the cured coatings are considered 100% solids, there may still exist a small amount of material which does not chemically bind into the polymer network on curing. Examples of such materials used in the coatings include unreacted monomer, unreacted photoinitiator, certain non-functional additives and so forth. The presence of excessive amounts of such materials is undesirable, inasmuch as volatilization of such components over time may change the physical properties of the coating. For example, volatile materials from the primary coating may permeate into the secondary coating, tending to plasticize it and resulting in strength loss. Also, volatile materials may cause production of unpleasant odors.

Still other important qualities of both optical fiber coatings are viscosity and shelf life. Good shelf life is considered formulation stability of at least six to twelve months. Viscosity can typically be somewhat adjusted by regulation of the temperature at which the coatings are applied. However, it is advantageous to set the viscosity high enough so as to maintain proper rheology and handling of the coating on application, but low enough to facilitate bubble release and to minimize the amount of heat needed in the preparation. Excessive heating is undesirable inasmuch as it may result in premature gelling or viscosity increase due to possible thermal initiation of polymerization.

PRIOR ART COATINGS

Various single or double layer fiber coatings exist in the prior art. Among these are epoxy- or urethane-based resins. However, many of these resins cure slowly; have poor hydrophobicity or poor hydrolytic, thermal and oxidative stability; and have undesirable yellowing properties.

There have also been developed primary (buffer) coatings which cure on exposure to ultraviolet radiation. Such prior art primary coatings, however, have conventionally not been very moisture resistant and have some of the same deficiencies as above.

To obviate these flaws, the primary-coated optical fibers of the prior art have been topcoated with a tough and flexible overcoat which possesses superior resistance to moisture abrasion. Prior art coatings have included extruded nylon "jacket" coatings, which are, however, more expensive and more difficult to apply than would be an ultraviolet-cured coating.

Therefore, the present invention seeks to provide primary and secondary coatings which, when cured, have maximal thermal, oxidative and hydrolytic stability, wherein the primary coating is adequately adherent to the glass fiber yet strippable therefrom; provides adequate cushioning of the fiber; has a relatively low glass transition temperature; and is capable of relieving stress upon the fiber. The secondary coating must function as a hard protective layer; have a relatively high glass transition temperature and high tensile modulus; be hydrophobic to resist moisture; have a high refractive index; and have an appropriate coefficient of friction value. In addition, the two coatings can be formulated for wet-on-wet application, with simultaneous radiation curing at commercially acceptable cure speeds.

In U.S. Ser. No. 742,531, filed Aug. 8, 1991, now U.S. Pat. No. 5,146,531 which was a continuation of U.S. Ser. No.350,239, filed May 11, 1989, now abandoned, and of which this application is a continuation-in-part, coating compositions prepared from acrylate- or methacrylate-based components and having excellent properties vis-à-vis the above characteristics were disclosed. That application discloses acrylate-modified primary and secondary coatings, the primary coating including an acrylated urethane oligomer; an alkyl acrylate monomer; a refractive index modifier; an adhesion promoter; and a photoinitiator. The secondary coating includes an acrylated urethane oligomer based on a polyester; a (meth)acrylated compound; and a photoinitiator.

SUMMARY OF THE INVENTION

It has now been discovered that it is the functional backbones of these components, rather than their end groups, that confer the excellent properties upon the compositions of the parent application. Thus, systems analogous to the acrylate- or methacrylate-based compositions of the parent application, but bearing any reactive end groups, are equally suitable in meeting these requirements. These applications are expressly incorporated by reference herein.

The present invention therefore addresses analogous systems incorporating various other exemplary end groups capable of reacting upon irradiation or other means, either by free radical initiation or cationic cure, to provide excellent performance coatings. Such end groups include, but are by no means limited to, free radical systems such as thiolene systems (based on the reaction of multifunctional thiols and unsaturated polyenes, such as vinyl ethers; vinyl sulfides; allylic ethers; and bicyclic enes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini. In fact, virtually any end groups which cure by irradiation or other means but do not adversely effect the desirable properties (i.e., the oxidative, thermal and hydrolytic stability and the moisture resistance) of the cured composition are envisioned.

Another contribution of the present invention over that of the parent application is the discovery that three of the components said in the parent application to be required are, in some circumstances, optional.

One of these components is a silane adhesion promoter, which, it has now been discovered, is not required in moderate- or low-temperature, low-humidity environments.

Another other component which is now known to be optional is a monomer or oligomer containing an aromatic moiety; in some instances, the composition itself may provide a refractive index suitable for the present invention without the addition of such monomer or oligomer capable of modifying refractive index.

Also, a photoinitiator is, in some instances, optional; for instance, when electron beam cure of a free radical system is envisioned, a photoinitiator may be omitted.

Accordingly, in preferred embodiments of the invention, a broad spectrum of radiation-curable primary and secondary coatings for optical fibers has been provided. The primary coatings have refractive indices greater than those of their fiber substrates, and relatively low glass transition temperatures and tensile moduli (i.e., less than about −20° C. and less than about 500 psi at 25° C., respectively). The secondary coatings have relatively high glass transition temperatures (i.e., abut 50° C.) and tensile moduli of about 100,000 psi at 25° C. The secondary coatings also have refractive indices greater than those of the cladding material of the optical fiber, for stripping out errant light in a monocoat application. An optical fiber coated with the secondary coating alone, or with the primary and secondary coatings of the present invention, has also been developed.

The radiation-curable primary coating for an optical fiber of the present invention comprises, in one preferred embodiment:

(A) from about 10 percent to about 90 percent by weight of a reactively terminated urethane oligomer which is the reaction product of (i) a hydrocarbon polyol, the hydrocarbon portion of which is from about 500 to about 4,000 molecular weight; (ii) an aliphatic polyisocyanate; and (iii) an endcapping monomer capable of supplying a reactive terminus;

(B) from about 10 percent to about 90 percent by weight of a hydrocarbon monomer containing between 6 and 20 carbon atoms which is terminated with at least one end group capable of reacting with the reactive terminus of (A); and (C) optionally, from about 0.05 percent to about 10.0 percent by weight of a photoinitiator, all of the above stated percentages by weight for the primary coating being based on the total weight of (A), (B) and (C).

Preferably, the hydrocarbon polyol portion of the oligomer (A) has a molecular weight in the range of about 600 to about 4,000.

The primary coating may optionally contain other materials, such as: a crosslinking agent; an organofunctional silane adhesion promoter; a chain transfer agent, preferably a mercapto-functional chain transfer agent; at least one stabilizer; and a monomer or oligomer capable of increasing the refractive index of the composition.

The secondary coating of the invention, in a preferred embodiment, comprises:

(I) from about 10 percent to about 90 percent by weight of an aliphatic urethane oligomer based on a polyester and/or polyether and containing a reactive terminus;

(II) from about 20 percent to about 60 percent by weight of a hydrocarbonaceous viscosity-adjusting component capable of reacting with the reactive terminus of (I); and (III) optionally, from about 0.5 percent to about 10.0 percent by weight of a photoinitiator, all of the stated percentages by weight for the secondary coating being based upon the total weight of (I), (II) and (III).

A coated optical fiber and process for preparing a coated optical fiber have been developed. In one embodiment, the process comprises sequentially applying to an optical fiber primary and secondary coating layers as described above and radiation-curing the coating layers.

The coating compositions of the invention are also useful for other coating and protective purposes. They can be formulated to be useful on glass, ceramic, granite, and marble surfaces, and the like.

DESCRIPTION OF THE PREFERRED EMBODIMENTS

The invention relates in part to radiation-curable primary and secondary coatings for optical fibers. The optical fibers which are coated may comprise a glass core and a glass cladding layer. The core, for example, may comprise silica doped with oxides of germanium or phosphorus and the cladding, a pure or doped silicate such as fluorosilicate. Alternately, the fibers may comprise a polymer-clad silica glass core. Examples of such polymer claddings include organosiloxanes such as polydimethylsiloxane or a fluorinated acrylic polymer.

The primary coating should have, inter alia, the following properties when cured: moisture resistance; ease of application and stripping; low volatiles content; low tensile modulus over the life of the fiber; low glass transition temperature; and long shelf life.

The secondary coating should form a hard protective layer; have a relatively high modulus and glass transition temperature; and also be moisture resistant.

Both coatings should be transparent; nonmalodorous; fast curing; and remain adherent, even upon aging in high heat and humidity environments.

The present invention involves the recognition that it is the backbone portions of the essential (and optional) ingredients of the composition that confer the excellent performance properties upon the composition, and that any end groups meeting certain requirements may be used in formulating the various components of the present invention. It is merely required that the components contain end groups which react upon exposure to irradiation or other initiation, i.e., where the components contains at least one terminus or group that is capable of reacting with a terminus or group of other components. The reactive groups, when cured, must produce a composition which is stable with respect to thermal, hydrolytic and oxidative stresses to which the cured composition may be subjected.

Additionally, while the end groups must react to cure well upon exposure to irradiation or other initiation, they should not be so reactive as to cure prematurely, so that, if desired, a "one package" system would be unfeasible.

While not desiring to be limitative, two broad classes of systems which meet these criterion are discussed and exemplified herein. One such system is a free radical initiated system, many examples of which are well known in the art and several types of which will be exemplified below.

A second system is a cationic cure-type system, wherein reactive acids are generated in the presence of ultraviolet light. Such cationic curing systems are known in the art and are generally disclosed, for example, in U.S. Pat. Nos. 3,981,987 and 4,981,881 to J. Crivello, assigned to General Electric Corporation and herein expressly incorporated by reference.

Again, however, these systems represent only non-limitative examples of chemistries which are suitable for use in the present invention; any system which does not compromise the qualities of the cured composition may be used. Furthermore, "hybrid" compositions containing mixtures of different reactive systems may be used, so long as their mixture does not interfere with the cure of either system, and their mixture does not adversely effect the cured composition.

Examples of free radical systems include, but are not limited to, acrylate- and methacrylate-based systems; thiolene-based systems; all-allylic systems; other vinylic (e.g., styrenic) norbornenyl systems; systems; acrylamide systems; itaconate systems; crotonate systems; amine-ene systems; acetylenic systems; and internally reactive systems.

One preferred free radical system other than (meth)acrylate which is exemplified herein is a thiolene system, which involves the reaction of a mercaptan (thiol) with a polyene, wherein the two components are reacted in stoichiometric proportion.

The polyene component of the thiolene system may, theoretically, be any component containing a reactive, unsaturated group, most desirably attached to an electron-rich atom or group. Thus, a preferred polyene is a polyfunctional vinyl ether; other suitable groups include but are not limited to allylic ethers; vinyl sulfides; styrenes; acrylamides and acetylenes.

Another suitable class of compound includes bicyclic enes such as norbornene carboxylate (the reaction product of cyclopentadiene and acrylate), although their ester functionality may compromise hydrolytic stability.

With respect to the thiol (mercaptan) component, primary thiols containing 6 to 18 carbon atoms, and preferably 8 to 16 carbon atoms, such as 1,10-decane dithiol, or any linear, cyclic or branched hydrocarbon thiol containing from one to four thiol groups may be used. Primary thiols are preferred, inasmuch as they are most reactive, followed by secondary, and, finally, the least reactive tertiary thiols.

Alternatively, even higher reactivity is achieved when the sulfur atom of the mercaptan is in the vicinity of a carbonyl group, e.g., mercaptoacetate or mercaptopropionate, although hydrolytic stability may be impaired, due to the presence of the ester group.

As mentioned, supra, an alternative system is a cationic curing system. Such systems require an onium salt, e.g., iodonium, sulfonium, arsonium, azonium, bromonium, or selenonium, which salt generates cations on exposure to ultraviolet light. Such onium salts are desirably modified by bonding thereto saturated hydrocarbon moieties, to improve their compatibility with the very hydrophobic components of the composition. Nonlimitative examples of such cationic curing reactive groups include vinyl ethers (wherein all reactive components are vinyl ether terminated); and epoxy terminated systems which react by ring opening (e.g., between cyclohexene oxide and oxirane or between glycidyl esters).

THE PRIMARY (BUFFER) COATING

The primary coating composition of the present invention contains three basic ingredients, (A), (B) and (C).

A. The Hydrocarbon-Based Oligomer

The first ingredient is a specific hydrocarbon-based oligomer (A). This component comprises from about 10 percent to about 90 percent by weight of the composition base on the total weight of the (A), (B) and (C) ingredients of the composition. Preferably, this oligomer comprises from about 15 percent to about 85 percent, and more preferably about 20 percent to about 80 percent by weight of the composition, based on total weight of the (A) through (C) ingredients.

The particular hydrocarbon-based oligomer used in the present invention was chosen to impart good thermal, oxidative and hydrolytic stability to the cured system.

It has been known in the art that various types of UV-curable oligomers exist which may yield a soft, compliant, low glass transition temperature-type coating. Acrylate-or methacrylate-terminated monomers are particularly commonly used due to their ease of cure upon ultraviolet radiation. One system known in the art is acrylate-endcapped polybutadiene-type rubber or rubber-modified acrylated monomers as base resins. While these systems have excellent low temperature properties and are suitably hydrophobic, their internal carbon-carbon double bonds (unsaturation) make them susceptible to oxidation over a long period of time.

It is also known in the art to employ acrylated silicones as base resins in such compositions. While these have good low temperature properties and hydrophobicity, they are difficult to formulate with a suitably high refractive index, tend to have poor thermal stability, and may be susceptible to hydrogen outgassing which can lead to signal attenuation in fibers so coated.

Yet another system known in the art involves the use of acrylated fluorocarbons. While these are suitably hydrophobic and thermally stable, they are typically incompatible with most non-halogenated organic compounds. Additionally, they are very expensive relative to other systems.

To overcome many of the disadvantages of the prior art systems, the primary coating of the present invention utilizes a urethane system based on an hydrogenated polybutadiene backbone. In general, urethane acrylate systems based on polyethers or polyesters were usually characterized by poor water resistance and by thermal instability. Additionally, known urethane oligomers based on aromatic isocyanates displayed thermal instability and tended to yellow. While polyether-based urethane acrylates have excellent low Tg properties, they are, when used alone, generally not hydrophobic enough for optical fiber applications and are susceptible to oxidation. Polyester-based urethane acrylates have good thermal stability but are susceptible to hydrolysis. Furthermore, it has now been found that other end groups besides acrylate and methacrylate which are capable of supplying a reactive terminus to the reactants are also very suitable for the purpose of this invention.

Thus, the primary coating of the present invention uses an oligomer which, in combination with the other components of the composition, obviates many of the above problems.

The oligomer (A) utilized in the primary coating of the present invention is the reaction product of (i) a hydrocarbon polyol, the hydrocarbon portion of which is from about 500 to about 4,000 molecular weight; (ii) an aliphatic polyisocyanate; and (iii) an endcapping monomer capable of supplying a reactive terminus.

The hydrocarbon polyol (i) is provided by a linear or branched hydrocarbon containing a plurality of hydroxyl end groups, and providing a hydrocarbon backbone to the oligomer. The hydrocarbon portion is from about 500 to about 4,000 molecular weight, and preferably about 600 to about 4,000 molecular weight. Molecular weight in this case is determined by gel permeation chromotography (GPC), using a methylene chloride solvent, as measured against polystyrene molecular weight standards. By "hydrocarbon" is meant a non-aromatic compound containing a majority of methylene groups (—CH$_2$—) and which may contain internal unsaturation and/or pendant unsaturation. Fully saturated (i.e., hydrogenated) hydrocarbons are preferred because the long term stability of the cured optical fiber coating increases as the degree of unsaturation decreases. Suitable hydrocarbon polyols include but are not limited to hydroxyl-terminated, fully or partially hydrogenated 1,2-polybutadiene polyol; 1,2-polybutadiene polyol hydrogenated to an iodine number of from 9 to 21; fully or partially hydrogenated polyisobutylene polyol; polybutene polyol; hydrogenated dimer diols; mixtures thereof, and the like. Preferably, the hydrocarbon polyol is substantially fully hydrogenated, and thus a preferred polyol is hydrogenated 1,2-polybutadiene.

The polyisocyanate component (ii) is non-aromatic. Oligomers based on aromatic polyisocyanates effect yellowing in the cured coating. Non-aromatic polyisocyanates of from 4 to 20 carbon atoms may be employed. Suitable saturated aliphatic polyisocyanates include but are not limited to isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and mixtures thereof. Isophorone diisocyanate is a preferred aliphatic polyisocyanate.

The reaction rate between the hydroxyl-terminated hydrocarbon and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethyl- ethylamine, morpholine, N-ethyl morpholine, piperazine, N,N-dimethyl benzylamine, N,N-dimethyl laurylamine, and mixtures thereof. A preferred catalyst is dibutyl tin dilaurate.

The endcapping monomer (iii) is one which is capable of supplying at least one reactive terminus. An exemplary end group conforms to the formula

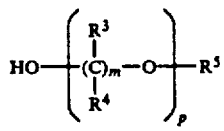

wherein R$^5$ is selected from the group consisting of acrylic, methacrylic, vinylic, allylic, styrenic, acrylamide, norbornenyl, acetylenic, epoxy, mercapto, amino, itaconic and crotonic; R$^3$ and R$^4$ are independently selected from the group consisting of hydrogen, methyl, ethyl or propyl; m is an integer from 1 to 10, and p is 0 or 1.

Examples of compounds which may be used for the endcapping monomer include but are not limited to acrylates, methacrylates, vinyl ethers, vinyl sulfides, allyls, bicyclic enes, mercaptans, acetylenes, epoxides, amines, styrenes, acrylamides, and so forth. Suitable hydroxyl-terminated compounds which may be used as the endcapping monomer include but are not limited to hydroxyethyl acrylate; hydroxyethyl methacrylate; hydroxypropyl acrylate; hydroxypropyl methacrylate; hydroxybutyl acrylate; hydroxybutyl methacrylate; allyl ether; hydroxyethyl vinyl ether; hydroxypropyl vinyl ether; hydroxybutyl vinyl ether; hydroxyethyl mercaptan; hydroxypropyl mercaptan; hydroxyethyl-3-mercaptopropionate; and hydroxypropyl-3-mercaptopropionate.

In an acrylate based system, a preferred endcapping monomer is hydroxyethyl acrylate or hydroxyethyl methacrylate. In a thiolene or in a cationic cure system, a preferred end-capping monomer is hydroxybutyl vinyl ether or, in the thiolene system, hydroxypropyl mercaptan.

The molar ratio of the polyol, diisocyanate and end-capping monomer is preferably approximately 1:2:2.

A preferred oligomer is based on the formula

where

R$^1$ is a linear or branched hydrocarbon polymer of from 500 to 4,000 (preferably 600 to 4,000) molecular weight selected from the group consisting of fully or partially hydrogenated 1,2-polybutadiene; 1,2- polybutadiene hydrogenated to an iodine number of from 9 to 21; fully or partially hydrogenated polyisobutylene; polybutene; and hydrogenated dimers;

$R^2$ is a linear, branched or cyclic alkylene of from six to twenty carbon atoms; and X and Q are independently either (a) a radical of the formula:

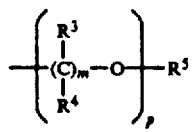

wherein $R^5$, m and p have the same meaning as above, or (b) a saturated alkyl radical of from nine to twenty carbon atoms, with the proviso that the above oligomer must possess at least one reactive terminal (end) group.

An especially preferred monomer is one in which $R^5$ is acrylic or methacrylic; this oligomer is disclosed in U.S. Pat. No. 4,786,586 to Lee et al., which patent is herein incorporated by reference.

The above-described oligomer is particularly suitable because its saturated hydrocarbon backbone gives the oligomer suitable hydrophobicity and thermal, oxidative and hydrolytic stability. The glass transition temperature of the oligomer is approximately $-20°$ C. and may be lowered by blending with additives, discussed infra.

The primary coating containing this oligomer has a water absorption value of less than 5% by weight, and preferably less than 2.5%.

Another particularly preferred oligomer is the vinyl ether analog or mercapto analog of the above oligomer, i.e., where $R^5$ is either vinylic or thiol, respectively. This oligomer also confers excellent thermal, oxidative and hydrolytic stability and hydrophobicity to a cured coating which includes it.

B. The Hydrocarbon Monomer

The second essential component of the composition of the primary coating composition is a hydrocarbon monomer which is terminated with at least one end group capable of reacting with the reactive terminus of (A). The hydrocarbon portion (moiety) of the monomer has between 6 and 20 carbon atoms, and preferably between 8 and 18. This monomer (B) may be either straight chained, branched or cyclic. This component comprises from about 10 percent to about 90 percent by weight of the composition, based upon the total weight of the (A), (B) and (C) ingredients of the composition. Preferably, it comprises from about 15 percent to about 85 percent, and more preferably from about 20 percent to about 80 percent by weight of the composition, based upon the total weight of the components (A), (B), and (C).

This second component is one having one or more end groups capable of reacting with the reactive terminus of (A). Thus, for example, in an acrylate system, the component might be acrylate-or methacrylate-terminated; in a thiolene system, vinyl ether-or mercaptan-terminated; and in a cationic cure system, vinyl ether-terminated.

The monomer is selected to be one that is compatible with the very hydrophobic oligomer discussed above. It is also chosen to be one which is soft-curing and which has a low Tg, thus lowering the Tg of the composition including it. Suitable examples of such monomers include but are not limited to acrylates and methacrylates such as hexyl acrylate; hexyl methacrylate; 2-ethylhexyl acrylate; 2-ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; $C_{14}$ to $C_{15}$ hydrocarbon diol diacrylates; $C_{14}$ to $C_{15}$ hydrocarbon diol dimethacrylates; primary $C_6$ to $C_{18}$ hydrocarbon-based dithiols such as 1,10-decane dithiol; secondary or tertiary dithiols (which are less reactive than the primary thiols); $C_6$ to $C_{18}$ thiolated esters such as mercaptoacetate esters or mercaptopropionate esters (which are desirably reactive but which may lack in long-term hydrolytic stability); $C_4$ to $C_{18}$ hydrocarbon diol divinyl ethers such as hexanediol divinylether; lauryl vinyl ether; ethylhexyl vinyl ether; isodecyl vinyl ether; butanediol divinyl ether; cyclohexanedimethanol divinyl ether; mixtures of $C_{14}$ and $C_{15}$ diol divinyl ethers; and mixtures of the above.

Preferred alkyl acrylate monomers include stearyl acrylate, lauryl acrylate and isodecyl acrylate. A particularly preferred one is lauryl acrylate. Preferred other hydrocarbon monomers include the $C_{10}$ dithiol, 1,10-decane dithiol, and the divinyl ether, hexanediol divinyl ether.

The monomer should be used in a quantity sufficient to adjust the total primary coating composition to a viscosity in the range of about 2,000 cps (centipoises) to 10,000 cps, measured by a Brookfield viscometer, model LVT, spindle speed of 6 rpm, spindle number 34, at 25° C.

C. The Photoinitiator

A third, optional, ingredient of the primary coating composition is a photoinitiator (C). In free radical systems, the photoinitiator is only required when ultraviolet radiation-cure is envisioned; in other embodiments, such as, for example, if electron beam cure of a free radical system is to be effected, the photoinitiator may be omitted. In cationically cured systems, however, a photoinitiator is required even when electron beam cure is to be effected.

The photoinitiator, when used in a small but effective amount to promote radiation cure, must provide reasonable cure speed without causing premature gelation of the composition. Further, it must not interfere with the optical clarity of the cured optical coating. Still further, the photoinitiator must itself be thermally stable, non-yellowing and efficient. The type of photoinitiator which is used will be dependent on whether a free radical-type system or a cationic cure type-system is used.

Suitable free radical-type photoinitiators include but are not limited to the following: hydroxycyclohexylphenyl ketone; hydroxymethylphenylpropanone; dimethoxyphenylacetophenone; 2-methyl-1-[4-(methylthio)phenyl]-2-morpholino-propanone-1; 1-(4-isopropylphenyl)-2-hydroxy-2-methylpropan-1-one; 1- (4-dodecylphenyl) -2-hydroxy-2-methylpropan-1-one; 4-(2-hydroxyethyoxy)phenyl-2(2-hydroxy-2-propyl)ketone;diethoxyphenyl acetophenone; and mixtures of these.

Suitable cationic cure-type photoinitiators include but are not limited to onium salts such as iodonium, sulfonium, arsonium, azonium, bromonium or selenonium, which are preferably chemically modified to render them more hydrophobic, e.g., by incorporating saturated hydrocarbon moieties such as alkyl or alkoxy substituents of from about 4 to about 18 carbon atoms. Particularly preferred cationic cure initiators include but are not limited to (4-octyloxyphenyl) phenyl iodonium hexafluoro antimonate; (4-octyloxyphenyl) diphenyl sulfonium hexafluoro antimonate; (4-decyloxyphenyl) phenyl iodonium hexafluoro antimonate; and (4-octadecyloxyphenyl) phenyl iodonium hexafluoro antimonate.

The photoinitiator, when used, preferably comprises from about 0.05 percent to about 10.0 percent by weight of the composition, based upon the total composition of the (A) through (C) ingredients. Preferably, the amount of photoinitiator is from about 0.2 percent to about 8.0 percent, and more preferably about 0.3 percent to about 7.0 percent by weight, based upon total weight of (A) (B) and (C) ingredients. Generally, cationic cured embodiments require lower amounts of photoinitiator than do free radical embodiments.

A particularly preferred free radical-type photoinitiator is hydroxycyclohexylphenyl ketone, and a particularly preferred cationic cure-type initiator is (4-octyloxyphenyl) phenyl iodonium hexafluoro antimonate. The photoinitiator should be chosen such that a cure speed, as measured in a dose versus modulus curve, of less than 1.0 J/cm$^2$, and preferably less than 0.5 J/cm$^2$, is required, when the photoinitiator is used in the designated amount.

D. The Optional Crosslinking Agent

Another optional ingredient is a crosslinking agent (D), which may be used in thiolene-type systems. This agent is typically a polyene or a polythiol which is capable of helping to coreact a multifunctional system. An example of a suitable crosslinking agent is trimethylolethane trivinyl ether. When used, the crosslinking agent comprises from about 1 percent to about 50 percent by weight, and preferably from about 5 percent to about 30 percent by weight of the composition, based on the total weight of the (A), (B) and (C) components.

E. The Optional Stabilizer

To improve shelf life (storage stability) of the uncured coating, as well as to increase thermal and oxidative stability of the cured coating, one or more stabilizers may optionally be included in the composition. Examples of suitable stabilizers include but are not limited to tertiary amines such as diethylethanolamine, diethyl hydroxyl amine, and trihexylamine; hindered amines; organic phosphites; hindered phenols; mixtures thereof; and the like. Some particular examples of antioxidants which can be used include but are not limited to octadecyl-3-(3',5'-di-tert-butyl-4'-hydroxyphenyl) propionate; thiodiethylene bis (3,5-di-tert-butyl-4-hydroxy) hydrocinnamate; butylated paracresol-dicyclopentadiene copolymer; and tetrakis [methylene (3,5-di-tert-butyl-4-hydroxyhydrocinnamate)] methane. Additionally, certain silanes may be used in very small quantities, e.g., as low as about 0.0001 percent to about 0.01 percent by weight, as stabilizers. One example of a suitable silane stabilizer is 3-aminopropyltrimethoxy silane.

When a stabilizer is used, it may be incorporated in an amount from about 0.0001 percent to about 3.0 percent by weight, based on the weight of the (A) through (C) ingredients. Preferably, it is included in the range from about 0.25 percent to about 2.0 percent by weight, and more preferably in the range from about 0.5 percent to about 1.5 percent by weight, based on the total weight of the (A) through (C) ingredients. Desirable properties of a stabilizer include (1) non-migration (probably enhanced by low polarity and high molecular weight) and (2) basicity (to allow it to help in neutralizing residual acid which might prematurely initiate polymerization). Preferred stabilizers are octadecyl-3-(3',5'-di-tert-butyl-4'-hydroxyphenyl) propionate and trihexylamine.

F. The Optional Adhesion Promoter

Another optional ingredient is an adhesion promoter (F). Adhesion becomes a particularly pertinent problem in high humidity and high temperature environments, where delamination is more of a risk. Accordingly, in low humidity, low temperature situations (i.e., below about 50% relative humidity and about 25° C.), the adhesion promoter is not required, although it may be required under conditions of higher humidity and higher temperature.

It is known in the art to use either acid-functional materials or organofunctional silanes to promote adhesion of resins to glass. While acid-functional materials are operative in some embodiments, organo-functional silanes are preferred. Acid-functional materials are less preferred because of their possible corrosivity towards the materials; their reactivity with certain systems (e.g., amin-enes); and their tendency to lose their adhesion properties on exposure to moisture. Silanes tend to be much more suitable in terms of these factors and, therefore, are the adhesion promoters of choice. Additionally, it is useful to have an adhesion promoter having a functionality which binds in with the system during cure, to maximize its adhesion promotion as well as to minimize the quantities of unbound volatiles. It is necessary to select a silane which does not react adversely with the chemistry of the system (e.g., amino-functional silanes in cationically cured systems).

Various suitable organofunctional silanes include but are not limited to amino-functional silanes; acrylamido-functional silanes; mercapto-functional silanes; allyl-functional silanes; vinyl-functional silanes; methacrylate-functional silanes; and acrylate-functional silanes. The adhesion promoters preferably are methoxy-or ethoxy-substituted as well.

Preferred organofunctional silanes include but are not limited to mercaptoalkyl trialkoxy silane, methacryloxyalkyl trialkoxy silane, aminoalkyl trialkoxy silane, vinyl trialkoxy silane, mixtures thereof, and the like.

The silane is, of course, chosen to be reactive with the rest of the system. Methacrylated silanes are desirable, when they are chosen to bind in well with the cured system, but tend to slow the cure speed of the system. The mercapto-functional adhesion promoters also chemically bind in during cure in many systems, but do not appreciably slow down the cure speed of the system. However, when mercapto-functional adhesion promoters are used in thiolene systems, it is necessary to adjust the stoichiometry of the polyene component accordingly. Allyl-functional and vinyl-functional silanes are also desirable when they are chosen to bind in well with the system used.

Some preferred organofunctional silanes that enhance adhesion in humid conditions include 3-aminopropyl triethoxy silane, 3-methacryloxypropyltrimethoxy silane, gamma-mercaptopropyl trimethoxy silane, gamma-mercaptopropyl (gamma-mercaptopropyl) triethoxy silane, beta-(3,4-epoxycyclohexyl) ethyl trimethoxy silane, gamma-glycidoxypropyl trimethoxy silane, 3-vinylthiopropyl trimethoxy silane, vinyl-tris-(beta-methoxyethoxy) silane, vinyl triacetoxy silane, and mixtures thereof. A particularly preferred adhesion promoter is gamma-mercaptopropyl trimethoxy silane.

The silane component, when used, should be incorporated into the composition in a small but effective amount to enhance the adhesion of the composition to the surface of an inorganic substrate, which in this embodiment, is glass, and in other embodiments, is glass, enamel, marble, granite or the like. The silane component, when used, comprises from about 0.1 percent to about 3.0 percent by weight of the composition, based on total weight of the ingredients (A), (B) and (C). Preferably, the silane comprises from about 0.2 percent to about 2.0 percent, and more preferably from about 0.3 percent to about 1.0 percent, based on the total weight of the oligomer, hydrocarbon monomer, and photoinitiator.

G. The Optional Monomer or Oligomer Containing An Aromatic Moiety

A further optional ingredient is a monomer or oligomer (G) which is capable of adjusting the refractive index of the composition. In some instances, adjustment is not necessary inasmuch as the the makeup of the oligomer (A) and/or of the other components confers an adequately high refractive index to the composition. The refractive index of the formulation, in any case, should ideally be about 1.48 or higher. The optional monomer or oligomer, when used, contains at least (1) an aromatic moiety, (2) a moiety providing a reactive terminus, and (3) a hydrocarbon moiety. This compound, when used, should be used in an amount effective for its stated purpose not in excess of about 60 percent by weight, and generally should comprise from about 5 percent to about 60 percent by weight, preferably, from about 10 percent to about 40 percent by weight and more preferably from about 15 percent to about 30 percent by weight of the composition, based upon total weight of the ingredients (A), (B) and (C).

The monomer or oligomer may be used to increase the refractive index for the reasons specified above. The aromatic moiety of the monomer or oligomer (B) is itself capable of raising the refractive index; however, the hydrocarbon moiety is required to increase the compatibility of this monomer with the hydrocarbon-based oligomer (A). The moiety containing the reactive terminus renders the compound compatible with the system as a whole, inasmuch as it has an available reactive group which allows it to crosslink with the rest of the composition upon ultraviolet curing, thus minimizing the volatiles content of the cured system.

Samples of aromatic monomers or oligomers additionally containing hydrocarbon character and a reactive group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these. Refractive index modifiers containing termini other than acrylate or methacrylate are also suitable, so long as the terminus of this ingredient is coreactive with the rest of the system.

In each case, the phenyl group serves to increase the refractive index of the coating and the nonyl component renders the composition somewhat more hydrophobic and, therefore, compatible with the hydrophobic oligomer (A). The refractive index of the composition including this monomer or oligomer is higher than that of the composition comprising only (A), (B) and (C). A suitable primary coating composition should, again, have a refractive index of greater than or equal to about 1.48.

The refractive index of the primary coating must be higher than that of the cladding of the fiber. If the fibers coated with the coating composition of the present invention are down-doped, i.e., contain dopants which lower the refractive index of the fiber itself, the refractive index of the coating will be different enough from that of the fiber so that errant signals will be refracted away even without the incorporation of this component. Therefore, in such embodiments, the monomer or oligomer (G) is not essential to the composition.

H. Optional Chain Transfer Agents

Various other optional components may be used in the primary coating beyond the (A) through (G) components which are required or optional and which are described above. For example, optional chain transfer agents (H) may be used to control the modulus and glass transition temperature of the coating in acrylate or methacrylate systems. One way known in the art to control the molecular weight and, consequently, the modulus and glass transition temperature of a polymerization product is to use one or more chain transfer agents. It is postulated that the addition of a chain transfer agent to a formulation lowers the molecular weight of a polymer produced and results in a lower modulus, lower glass transition temperature coating.

Preferred chain transfer agents which may be used in acrylate or methacrylate systems are mercapto compounds, optionally having a hydrocarbon chain of at least eight carbon atoms. Examples of suitable mercapto chain transfer agents include methyl thioglycolate; methyl-3-mercaptopropionate; ethyl thioglycolate; butyl thioglycolate; butyl-3-mercaptopropionate; isooctyl thioglycolate; isooctyl-3-mercaptopropionate; isodecyl thioglycolate; isodecyl-3- mercaptopropionate; dodecyl thioglycolate; dodecyl-3-mercaptopropionate; octadecyl thioglycolate; and octadecyl-3-mercaptopropionate. Parathiocresol; thioglycolic acid; and 3-mercaptopropionic acid may also be used, but may display some incompatibility with the resin and may produce odor problems.

A particularly preferred chain transfer agent is octadecyl-3-mercaptopropionate (ODMP).

The chain transfer agent may, if used, comprise from about 0.1 percent to about 10.0 percent by weight of the composition based upon the total weight of ingredients (A) through (C). Preferably, the chain transfer agent comprises from about 0.25 percent to about 5.0 percent by weight, and still more preferably from about 0.5 percent to about 4.0 percent by weight, based on the total weight of the (A), (B) and (C) components. A suitable chain transfer agent, when incorporated at about a 1.0 percent by weight level, lowers the glass transition temperature of the composition by about 3° C., lowers the modulus by about 100 psi, and apparently increases the adhesion of the coating to the glass fiber.

When greater than about 2.0 percent by weight of the chain transfer agent is incorporated in the composition, the modulus and glass transition temperature of the composition are desirably lowered, but the shelf life is reduced somewhat.

One preferred primary composition for coating an optical fiber, then, comprises the following:
- (A) from about 45 percent to about 65 percent by weight of an aliphatic urethane acrylate oligomer having as a backbone an hydrogenated 1,2-polybutadiene polymer;
- (B) from about 10 percent to about 20 percent by weight of lauryl acrylate;
- (C) from about 15 percent to about 30 percent by weight of polypropylene glycol nonylphenyl ether acrylate;
- (D) from about 0.3 percent to about 1.0 percent by weight of gamma mercaptopropyl trimethoxy silane adhesion promoter;
- (E) from about 2.0 percent to about 7.0 percent by weight of hydroxycyclohexylphenyl ketone photoinitiator;
- (F) from about 0.5 percent to about 4.0 percent by weight of octadecyl-3-mercaptopropionate, a chain transfer agent; and
- (G) from about 0.5 percent to about 1.5 percent by weight of octadecyl-3-(3',5'-di-tert-butyl-4'-hydroxyphenyl) propionate, wherein all of the stated percentages are percentages by weight, based upon total weight of (A) through (E), inclusive.

Another preferred primary coating, based on a thiolene-type system, comprises the following:
- (A) from about 30 percent to about 70 percent by weight of an aliphatic vinyl ether-terminated urethane oligomer having as a backbone an hydrogenated 1,2-polybutadiene polymer;
- (B) from about 5 percent to about 40 percent by weight of 1,10-decane dithiol;
- (C) from about 2 percent to about 10 percent by weight of hydroxymethyl phenyl propanone photoinitiator;
- (D) from about 1 percent to about 20 percent by weight of trimethylol ethane trivinyl ether crosslinking agent; and
- (E) from about 0,001 percent to about 0.1 percent by weight of diethyl hydroxyl amine stabilizer; and
- (F) optionally, from about 0.3 percent to about 1.0 percent by weight of gamma mercaptopropyl-trimethoxy silane adhesion promoter, wherein all of the stated percentages are percentages by weight based upon total weight of (A), (B), and (C).

Yet another preferred primary coating composition is a cationic cure-type system comprising the following:
- (A) from about 20 percent to about 80 percent by weight of an aliphatic vinyl ether-terminated urethane oligomer having as a backbone an hydrogenated 1,2-polybutadiene polymer;
- (B) from about 5 percent to about 80 percent by weight of a divinyl ether capable of reaction by cationic cure with (A), such as hexanediol divinyl ether;
- (C) from about 0.05 percent to about 5.0 percent by weight of an iodonium cationic cure initiator, such as (4-octyloxyphenyl) phenyl iodonium hexafluoro antimonate; and
- (D) optionally, from about 0.3 percent to about 1.0 percent by weight of a mercapto-functional, vinyl-functional, (meth) acrylate-functional or epoxy-functional silane, wherein all of the percentages are based upon total weight of (A), (B) and (C).

THE SECONDARY COATING

The most important properties of the secondary optical fiber coating are, again, good thermal, oxidative and hydrolytic stability after cure; hardness; high tensile modulus; high glass transition temperature; and high refractive index. The secondary coating of the present invention was thus formulated to possess these and other qualities. Again, the secondary coating of the present invention comprises
- (I) from about 10 percent to about 90 percent by weight of an aliphatic urethane oligomer based on a polyester and/or polyether and containing a reactive terminus;
- (II) from about 20 percent to about 60 percent by weight of a hydrocarbonaceous viscosity-adjusting component capable of reacting with the reactive terminus of (I);
- (III) optionally, from about 0.05 percent to about 10.0 percent by weight of a photoinitiator, all of the stated percentages by weight being based upon the total weight of (I), (II) and (III).

The reactive termini of the secondary coating may be any of those disclosed as suitable for the primary coating and may or may not, in the case of a two-coat system, be the same termini as in the primary coating, so long as the chemistries of the end groups do not interact adversely, e.g., amine-ene systems and cationic cure systems. As with the primary coating, "hybrid" compositions may also be used for the secondary coating.

(I.) The Aliphatic Urethane Oligomer With Reactive Terminus

The first essential component (I) of the secondary coating composition is an aliphatic urethane oligomer based on a polyester and/or polyether and having a reactive terminus.

Commonly used prior art oligomers in UV-curing systems include acrylated polyesters, epoxies and urethanes. Acrylated polyesters are undesirable inasmuch as they are susceptible to hydrolysis on high temperature hydrolytic aging. Acrylated epoxies have unacceptable thermal and oxidative stability problems and are prone to yellowing. With respect to the acrylated urethanes, both aromatic and aliphatic isocyanate-based urethanes are available. The aromatic urethanes have poor thermal and oxidative stability, but the aliphatic urethanes do not possess these deficiencies.

The backbone of most commercially available urethane acrylates is of a polyether or polyester nature. Both of these backbones have inherent disadvantages. The polyethers are generally hydrolytically stable, but are susceptible to oxidation. The polyesters, on the other hand, are oxidatively stable but susceptible to hydrolysis. Polyesters can be protected from hydrolysis by maximizing the formulation hydrophobicity via the selection of hydrophobic monomers, initiators, additives, and so forth, and/or by selection of inherently hydrophobic polyesters. Formulation hydrophobicity can be improved in the same manner when polyether-based urethanes are used.

However, with polyether-based urethanes, it is also necessary to add various thermal stabilizers and antioxidants. Thus, one preferred approach is to use hydrophobic polyester-based urethanes that are protected from hydrolysis via selection of other protected constituents so as to maximize overall formulation hydrophobicity. This is important because the overall physical properties of the coating are dramatically compromised if it absorbs water. Another preferred approach is to use polyether-based urethanes that are protected against oxidative instability by judicious choice of stabilizers.

Yet another preferred approach is to use urethanes based on a mixture of polyesters and/or polyethers. Such mixture can be formed either by mixing preformed terminally reactive polyether urethanes with preformed terminally reactive polyester urethanes, or by formulating a mixed batch by reacting both polyester units and polyether units with an isocyanate precursor to form a mixed oligomer, and then adding the reactive termini.

A suitable base oligomer, then, is an aliphatic urethane oligomer having a polyester and/or a polyether backbone. An example of a particularly desirable one is an acrylated aliphatic urethane oligomer, containing 75 percent oligomer solids in a hexanediol diacrylate solvent. A suitable oligomer is Cargill 1512, available from Cargill Inc., Minneapolis, Minn., which comprises 75 percent by weight of an acrylated aliphatic urethane oligomer based on a polyester and a polyether in 25 percent by weight hexanediol diacrylate. Other suitable oligomers are Photomer 6008, an acrylated aliphatic urethane oligomer based on a polyether, from Henkel Corporation, Ambler, Pa., and AB2010A, also an acrylated aliphatic oligomer based on a polyether, from American Biltrite Inc., Lawrenceville, N.J. In other embodiments, other termini than diacrylates may be used, as specified for the primary coating.

The oligomer component comprises from about 10 percent to about 90 percent by weight, preferably about 30 percent to about 80 percent by weight, and more preferably from about 40 percent to about 80 percent by weight of the total weight of the essential composition, dry solids basis, the above percentages being based on the weight of oligomer only.

(II.) The Hydrocarbonaceous Viscosity-Adjusting Component

The second component in the secondary coating is a hydrocarbonaceous viscosity-adjusting compound which is capable of reacting with the terminus of (I). One function of this compound is to adjust the viscosity of the coating to one which renders it easy to apply to buffer-coated fibers. The compound is one which is hydrocarbon in nature so as to render it hydrophobic and to make it compatible with the rest of the system, and preferably which contains a bicyclic structure so that it is shrinks minimally when cured.

Suitable such components include but are not limited to isobornyl acrylate; isobornyl methacrylate; $C_6$ to $C_{16}$ saturated hydrocarbon diol acrylates or methacrylates such as a mixture of $C_{14}$ and $C_{15}$ diol diacrylates or dimethacrylates, hexanediol diacrylate or hexanediol dimethacrylate; isobornyl vinyl ether; $C_6$ to $C_{16}$ saturated hydrocarbon diol vinyl ethers such as hexanediol divinyl ether or cyclohexane dimethanol divinyl ether; $C_6$ to $C_{16}$ saturated dithiols such as hexanedithiol, decanedithiol, and cyclohexane dimethanol dithiol; $C_6$ to $C_{16}$ saturated hydrocarbon terminal dioxides such as tetradecadiene dioxide; $C_6$ to $C_{16}$ saturated hydrocarbon terminal diglycidyl ethers such as hexanediol diglycidyl ether; or mixtures of these, so long the mixtures are coreactive but not adversely reactive with the oligomers used in the (I) component. A mixture of isobornyl acrylate and hexanediol diacrylate (the hexanediol diacrylate being provided as the reactive solvent for the oligomer) is a preferred constituent.

The component (II) comprises from about 20 percent to about 60 percent by weight of the composition, more preferably from about 25 to about 50 percent, and still more preferably from about 30 to about 40 percent by weight, based on total weight of the (I), (II) and (III) components, dry solids basis.

III. The Optional Photoinitiator

As with the primary coating, a photoinitiator (III) is a desirable component of the secondary coating but is, in the case of free radical systems, required only when ultraviolet cure is to be used. Any of the acceptable photoinitiators disclosed as suitable for the primary coating are again suitable; again, preferred photoinitiators are hydroxycyclohexylphenyl ketone and (4-octyloxyphenyl) phenyl iodonium hexafluoro antimonate. The photoinitiator is used in an amount that is effective to initiate curing of the composition, and may comprise from about 0.05 percent to about 10 percent by weight, based on the total weight of (I), (II) and (III), preferably from about 0.2 percent to about 8.0 percent by weight and more preferably from about 0.3 percent to about 7.0 percent by weight of the photoinitiator, based on the weight of the (I), (II) and (III) components, is used.

Generally, a lower level of photoinitiator is acceptable and perhaps desirable in the secondary coating relative to the primary coating, though this is not a requirement. In order to maximize the amount of light available to cure the primary coating through the secondary coating, it is important not to use too much photoinitiator in the secondary coating, as in the case where the coatings are applied wet-on-wet and then simultaneously cured.

IV. Other Optional Ingredients

As with the primary coating, various optional additives such as stabilizers may be incorporated, including but not limited to one or more of organic phosphites, hindered phenols, hindered amines, certain silanes, mixtures thereof, and the like. A particularly preferred stabilizer is thiodiethylene bis(3,4-di-tert-butyl-4-hydroxy) hydrocinnamate. When used, the stabilizer may be present in amounts of from about 0.1 percent to 3 percent by weight, more preferably from about 0.25 percent to about 2 percent by weight, and still more preferably from about 0.5 to about 1.5 percent by weight, based on the total weight of (I) oligomer, (II) monomer and (III) photoinitiator.

Another optional additive for the secondary coating is a surface tension adjusting silicone additive, which may be used in embodiments where a secondary coating is to be applied atop a cured primary coating.

Also, a crosslinking agent may, optionally, be included in the secondary coating as well.

One preferred secondary coating composition for coating an optical fiber, then, comprises the following:
(I) from about 40 percent to about 80 percent by weight of an acrylated aliphatic urethane oligomer based on a polyester and/or polyether; and
(II) from about 25 percent to about 50 percent by weigh of a mixture of isobornyl acrylate and hexanediol diacrylate; and (III) from about 2.0 percent to about 7.0 percent by weight of hydroxycyclohexylphenyl ketone photoinitiator, wherein all of the stated percentages are by weight, based upon total weight of (I), (II) and (III).

More preferably, this composition also includes from about 0.5 percent to about 1.5 percent by weight, based on the weight of the composition, of a stabilizer such as thiodiethylene bis (3,5-di-tert-butyl-4-hydroxy) hydrocinnamate. Also, in one embodiment, a crosslinking agent of the type and in the amount disclosed for the primary coating may be used. In other preferred embodiments, a surface tension adjusting additive may be included as well, and the oligomer component (I) may be a mixture of aliphatic urethane acrylate oligomers based on polyether backbones.

Analogous systems, i.e., systems having the same functional backbones but different reactive groups, again, may include but are not limited to other free radical type systems such as thiolene systems; amine-ene systems; acetylenic systems and internally-reactive systems; and cationic cured systems such as onium salt-induced vinyl ether systems and epoxy-terminated systems. As with the primary coating, any reactive end group chemistry which, when cured, produces a coating which is sufficiently hydrophobic and which has good thermal, oxidative and hydrolytic stability. Any system which does not adversely interact with the chemistry of the primary coating, including "hybrid" systems as well as "single chemistry"-type systems, may be used in the secondary coating.

The 2.5% tensile modulus of the secondary coating should be at least about 40,000 psi, and preferably at least about 100,000 psi, measured at 25° C. The relatively high modulus of the secondary coating relative to the primary results in desirable properties, such as cut-through resistance and microbending resistance, and in the formation of slick fibers, allowing for easy spooling and unspooling.

In a preferred embodiment, the secondary coating of the invention may be used overtop a primary coating. However, in another embodiment, optical fibers may be coated directly with the secondary coating, omitting a primary coating layer. Such conditions where a secondary coating alone may suffice include those in which the fiber will not be exposed to extremes in temperature, to high humidity, or to an excessive amount of bending. Such uses might include long haul applications such as transoceanic or transcontinental cables wherein the fibers are enclosed in cabling material.

PREPARATION OF A COATED OPTICAL FIBER

The invention also relates to a process for preparing a coated optical fiber. The process comprises (i) applying to an optical glass fiber a primary coating layer comprising (A) from about 10 percent to about 90 percent by weight, based upon total weight of (A), (B) and (C), of a reactively terminated urethane oligomer which is the reaction product of (i) a hydrocarbon polyol, the hydrocarbon portion of which has a molecular weight of from about 500 to about 4,000 (and preferably about 600 to about 4,000); (ii) an aliphatic polyisocyanate; and (iii) an endcapping monomer capable of supplying a reactive terminus;

(B) from about 10 percent to about 90 percent by weight, based upon total weight of (A), (B) and (C), of a hydrocarbon monomer having 6 to 20 carbon atoms in its alkyl moiety and which is terminated with at least one end group capable of reacting with the reactive terminus of (A);

(C) optionally, from about 0.05 percent to about 10.0 percent by weight, based upon total weight of (A), (B) and (C), of a photoinitiator;

(ii) applying atop said primary coating layer a secondary coating layer comprising (I) from about 10 percent to about 90 percent by weight, based upon the total weight of (I), (II) and (III), of an aliphatic urethane oligomer based on a polyester and/or polyether and containing a reactive terminus;

(II) from about 20 percent to about 60 percent by weight, based upon the total weight of (I), (II) and (III), of a hydrocarbonaceous viscosity-adjusting component capable of reacting with the reactive terminus of (I);

(III) optionally, from about 0.05 percent to about 10.0 percent by weight, based upon the total weight of (I), (II) and (III), of a photoinitiator; and, preferably, (iii) radiation-curing in situ said primary and secondary coating layers, e.g., by ultraviolet irradiation.

In an alternate embodiment, the process comprises applying only the secondary coating of the invention to the optical fiber and radiation-curing the secondary coating in situ.

The primary and/or secondary coatings may be applied and cured by any method known in the art. A preferred method, whereby two coatings are applied wet-on-wet, is disclosed in U.S. Pat. No. 4,474,830 to C. Taylor of AT&T Bell Laboratories. The coating or coatings may then be cured in situ, preferably by ultraviolet irradiation, to obtain a cured polymeric coating. Alternatively, the primary coating may be applied and cured, after which the secondary coating may be applied and cured.

COATED OPTICAL FIBERS OF THE INVENTION

The invention further relates to optical fibers, and especially to glass optical fibers, that are coated with the primary or secondary coating of the invention alone, or coated with both the primary and secondary coatings. These coatings may be prepared from reactively terminated materials that are radiation-curable and are radiation-cured in situ subsequent to application on glass fiber.

The primary coating surrounding the fiber forms a cured polymeric material preferably having a glass transition temperature (Tg) of no more than about −20° C. and more preferably lower, i.e., about −30° C., or even lower.

The cured secondary coating should have a relatively high Tg, generally approximately 50° C., and a high tensile modulus, i.e., above 40,000 psi and preferably about 100,000 psi. It is desirable for the secondary coating to have a Tg higher than its highest use temperature. This is because at or near the Tg of the polymer, the physical properties change dramatically with small changes in temperature.

When cured, the two coatings of the invention confer extraordinary thermal, hydrolytic and oxidative stability to the fiber and relieve stress thereon. Optical fibers having applied thereto both the primary and secondary coatings of the invention are highly moisture resistant and otherwise protected from environmental damage.

The coating compositions of the present invention have been disclosed hereinabove for use as optical fiber coatings. However, it is to be understood that these coatings may be used in any embodiment wherein stable, moisture resistant coatings are desired, especially for coating the surface of an optically useful article. For example, the coatings may be used for such diverse end uses as coating sheet glass (i.e., in the preparation of safety glass) to coating vinyl materials (e.g., in preparing no-wax floors). Other optically useful articles which may be prepared include, but are not limited to, photoswitches, photorelay devices, microelectronic devices, photocoupling devices, and so forth.

EXAMPLES

The following Examples serve to further illustrate the invention. In these Examples and elsewhere throughout this application, all parts and percentages are by weight, on a dry solids basis, and all temperatures are in degrees centigrade unless expressly stated to be otherwise. In all of the examples, cure speeds were measured with an International Light IL 745-A radiometer with model A309 light bug. Unlike elsewhere in the application, where percentage by weight referred to the total weight of either the (A) through (C) ingredients for the primary coating, or the I through III ingredients for the secondary coating, respectively, parts by weight in the Examples refers to the total composition described in that Example, including all components. The optional ingredients are identified by an asterisk (*) in the Examples. The other components are essential for use, if the exemplified coating is to meet the rigorous requirements for a commercially acceptable coating for optical glass fiber. It should be noted that, although the photoinitiator is identified as optional in the specification, it is, in fact, required in any system cured by ultraviolet irradiation, and therefore is not denoted as optional in such Examples. It should also be noted that, unless otherwise indicated, throughout the Examples and the remainder of this application, "modulus" refers to 2.5% tensile modulus, measured using an Instron tensile tester.

EXAMPLE I

Primary Coating for Optical Fibers

An ultraviolet-curable, primary coating composition was made up as follows:

| Ingredient | Parts by Weight |
|---|---|
| aliphatic urethane acrylate oligomer with saturated hydrocarbon backbone (A) | 55.00 |
| lauryl acrylate (B) | 14.50 |
| hydroxycyclohexylphenyl ketone photoinitiator (C) | 6.00 |
| octyldecyl-3-(3',5'-di-tert- | 1.50 |

| Ingredient | Parts by Weight |
|---|---|
| butyl-4'-hydroxy) hydrocinnamate stabilizer (E)* | |
| octadecyl-3-mercaptopropionate chain transfer agent (H)* | 2.75 |
| gamma-mercaptopropyl trimethoxy silane adhesion promoter (F)* | 0.75 |
| polypropylene glycol nonylphenylether acrylate (G)* | 19.50 |

The viscosity of the uncured coating was 4005 cps (at 25° C. using a Brookfield viscometer, model LVT, 6 rpm, #34 spindle).

A six mil coating of this composition was applied to a flat glass sheet using a Bird applicator and cured in air at 0.7 J/cm$^2$ using a 200 watts per inch medium pressure mercury vapor lamp.

The cured primary coating which resulted had a glass transition temperature of about −39.6° C., and a cured film refractive index of 1.492. The effect of temperature on 2.5% tensile modulus was as follows: 25° C.: 153.0 psi; 0° C.: 167.8 psi; −20° C.: 864.7 psi; −40° C.: 49,807 psi; −60° C.: 199,018 psi. The cure speed, as determined by a modulus versus dose curve, was determined to be about 0.3 J/cm$^2$.

Water absorption of the sample was measured as follows. The cured film was equilibrated at 50% (±5%) relative humidity and 23° C. (±2° C.) for 48 hours. The sample was weighed and a weight "A" recorded. The sample was then soaked for 24 hours at 25° C. in distilled water, then patted dry and weighed. This weight was recorded as "B". The sample was next placed in a vacuum oven under 10 mm Hg pressure at 25° C. for 24 hours, removed, and again equilibrated at 50% (±5%) relative humidity at 23° C. (±2° C.) for 48 hours and weighed. This third weight was recorded as "C". Percent water absorption measured as $$\frac{B-C}{A} \times 100\%$$

was about 1.48%.

Other samples of this 6 mil thick coating were tested as follows to determine the effect of accelerated aging on various properties. The samples were equilibrated at 50% (±5%) relative humidity and 23° C. (±2° C.) for 48 hours and then placed on clips and hung in an environmental chamber under the following accelerated aging conditions:

(1) 125° C. for 7 days;
(2) 93.3° C. for 10 days;
(3) 93.3° C. for 30 days;
(4) 93.3° C., 95% relative humidity, for 10 days; and
(5) 93.3° C., 95% relative humidity, for 30 days.

After the designated time period, the samples were removed and again equilibrated for 48 hours. The following properties were recorded. These data indicate excellent stability against thermal and hydrolytic stress.

| | 125° C., 7 days | 93.3° C., 10 days | 93.3° C., 30 days | 93.3° C., 95% relative humidity, 10 days | 93.3° C., 95% relative humidity, 30 days |
|---|---|---|---|---|---|
| weight change | −7.68% | −6.71% | −6.98% | −0.71% | −1.62% |
| Tg midpoint | −34.6° C. | −34.6° C. | −36.6° C. | −35.5° C. | −36.6° C. |
| Instron (tensile) modulus change | +33.1% | +39.4% | +37.9% | +27.9% | +19.5% |

| | 125° C., 7 days | 93.3° C., 10 days | 93.3° C., 30 days | 93.3° C., 95% relative humidity, 10 days | 93.3° C., 95% relative humidity, 30 days |
|---|---|---|---|---|---|
| (at 25° C.) | | | | | |

EXAMPLE II

Another Primary Coating for Optical Fiber

An ultraviolet radiation-curable primary coating was made up as follows:

| Ingredient | Parts by Weight |
|---|---|
| aliphatic urethane acrylate oligomer with saturated hydrocarbon backbone (A) | 56.00 |
| isodecyl acrylate (B) | 11.75 |
| hydroxymethylphenyl-propanone photoinitiator (C) | 6.00 |
| thiodiethylene bis (3,5-di-tert-butyl-4-hydroxy) hydrocinnamate stabilizer (E)* | 0.50 |
| gamma mercaptopropyl trimethoxy silane adhesion promoter (F)* | 0.75 |
| polyethylene glycol nonylphenyl ether acrylate (G)* | 25.00 |

The above formulation used several different ingredients, and somewhat different proportions, than were used in Example I. This formulation had a viscosity of 5650 cps at 25° C. using a Brookfield viscometer, model LVT, 6 rpm, #34 spindle, and a refractive index of 1.4849 at 21.8° C. When coated onto a glass plate in the same manner as in Example I and cured in air at 0.7 J/cm$^2$ under a medium pressure 200 watts per inch mercury vapor lamp, the resultant 6 mil thickness coating had a tensile modulus of 295.8 psi, a Tg of −28.7° C., good adhesion to glass and low water absorption (2.02%). The coating performed well in high humidity and dry accelerated aging tests.

EXAMPLE III

A Further Primary Coating for Optical Fiber

The following primary coating was formulated:

| Ingredient | Parts by Weight |
|---|---|
| aliphatic urethane acrylate oligomer with saturated hydrocarbon backbone (A) | 56.00 |
| octyl/decyl acrylate (B) | 11.75 |
| hydroxymethylphenyl-propanone photoinitiator (C) | 6.00 |
| thiodiethylene bis (3',5'-di-tert-butyl-4-hydroxy) hydrocinnamate stabilizer (E)* | 0.50 |
| gamma-mercaptopropyl trimethoxy silane adhesion promoter (F)* | 0.75 |
| polyethylene glycol nonylphenylether acrylate (lower MW polyethylene glycol than that of Example II) (G)* | 25.00 |

This formulation demonstrated the use of alternate (B) and (C) materials. This formulation had a viscosity of 3890 cps at 25° C. using a Brookfield viscometer, model LVT, spindle #34, 6 rpm. When applied to a glass plate as in Example I and cured in air at 0.7 J/cm$^2$ under 200 watt per inch medium pressure mercury vapor lamp, it had a tensile modulus of 276.0 psi, good adhesion to glass, and low water absorption (1.89%).

EXAMPLE IV

Another Primary Coating for Optical Fibers

The following primary coating was formulated:

| Ingredient | Parts by Weight |
|---|---|
| aliphatic urethane acrylate oligomer with saturated hydrocarbon backbone (A) | 64.00 |
| isodecyl acrylate (B) | 20.50 |
| hydroxymethylphenyl-propanone photoinitiator (C) | 6.00 |
| thiodiethylene bis (3',5'-di-tert-butyl-4'-hydroxy) hydrocinnamate stabilizer (E)* | 0.50 |
| gamma-mercaptopropyl trimethoxy silane adhesion promoter (F)* | 0.35 |
| polyethylene glycol nonylphenylether acrylate (same MW as in Example III) (G)* | 8.00 |
| isooctyl-3-mercaptopropionate chain transfer agent (H)* | 0.65 |

This formulation demonstrated the use of different proportions of ingredients, the use of an alternate chain transfer agent, and the use of a low concentration of the component (G) to adjust the refractive index. The formulation had a viscosity of 5950 cps at 25° C. using a Brookfield viscometer, model LVT, 6 rpm, #34 spindle, and a refractive index of 1.4796 at 21.5° C. When applied to a glass sheet as a 6 mil coating as in Example I and cured in air at 0.7 J/cm$^2$ under a medium pressure 200 watts per inch mercury vapor lamp, it had a tensile modulus of 280 psi a Tg of −31.2° C., good adhesion to glass, and low water absorption (1.41%).

EXAMPLE V

A Slower Curing Primary Coating for Optical Fibers

A radiation curable primary coating was formulated as follows:

| Ingredient | Parts by Weight |
|---|---|
| aliphatic urethane acrylate oligomer with saturated hydrocarbon backbone (A) | 54.00 |
| lauryl acrylate (B) | 14.00 |
| hydroxycyclohexylphenyl ketone photoinitiator (C) | 6.00 |
| octadecyl-3-mercaptopropionate chain transfer agent (H)* | 4.00 |
| octadecyl-3(3',5'-di-tert-butyl-4'-hydroxy phenyl) propionate stabilizer (E)* | 1.50 |
| gamma-methacryloxypropyl trimethoxysilane adhesion promoter (F)* | 1.00 |
| polypropylene glycol nonylphenylether acrylate (G)* | 19.50 |

The viscosity of the uncured coating was 3750 cps (at 25° C. using a Brookfield viscometer, model LVT, 6 rpm, #34 spindle).

When coated on a glass sheet at 6 mils and cured as in previous Examples, the coating adhered well under high humidity conditions but cured much slower than the coating of Example I. Similar formulations can be prepared that have much more rapid rates of cure, by substituting acrylated silanes for the methacrylated silane used in this Example.

The cured primary coating which resulted had a glass transition temperature of about −39.4° C., a tensile modulus of 155.5 psi, and a cured film refractive index of 1.492. The cure speed was determined to be 0.5 J/cm$^2$, and the water absorption was 1.40%, both being determined according to the methods of Example I.

Weight change, glass transition temperature and Instron (tensile) modulus change were measured under the same conditions as in Example I and recorded to be as follows. Again, excellent hydrolytic and thermal stability was observed.

|  | Initial | 125° C., 7 days | 93.3° C. 95% RH, 10 days | 93.3° C. 95% RH, 30 days |
|---|---|---|---|---|
| Tg Midpoint | −29.7° C. | −29.0° C. | −31.4° C. | −31.4° C. |
| 2.5% (tensile) Modulus (psi) | 292.5 | 281.3 | 286.1 | 302.2 |
| Instron (tensile) modulus, % change (at 25° C.) | — | −3.8 | −2.2 | 3.3 |
| Weight change, % | — | −4.46 | −2.19 | −1.81 |
| % elongation at break | 65.4 | 69.2 | 69.4 | 65.4 |
| rupture strength (psi) | 118.6 | 117.1 | 122.2 | 119.3 |

|  | 125° C., 7 days | 93.3° C., 10 days | 93.3° C., 30 days | 93.3° C., 95% relative humidity, 10 days | 93.3° C., 95% relative humidity, 30 days |
|---|---|---|---|---|---|
| weight change | −7.94% | −6.84% | −7.19% | −1.97% | −1.58% |
| Tg midpoint | −35.9° C. | −36.1° C. | −35.5° C. | −35.7° C. | −36.4° C. |
| Instron (tensile) modulus change (at 25° C.) | +33.8% | +36.1% | +36.0% | +20.1% | +10.9% |

These data show excellent stability against thermal and hydrolytic stress for the above composition.

EXAMPLE VI

A Primary Coating Based On A Thiolene System

The following primary coating was formulated:

| Ingredient | Parts by Weight |
|---|---|
| aliphatic urethane oligomer with saturated hydrocarbon backbone end-capped with hydroxybutyl vinyl ether (A) | 66.23 |
| 1,10-decane dithiol (B) | 19.21 |
| hydroxymethylphenyl propanone photoinitiator (C) | 6.11 |
| trimethylolethane trivinyl ether crosslinking agent (D)* | 8.43 |
| diethyl hydroxyl amine stabilizer (E)* | 0.02 |

The viscosity of the uncured coating was 3,770 cps at 25° C., using a Brookfield viscometer, model LVT, 6 rpm, #34 spindle.

A six mil coating of the above was applied to glass using a Bird applicator and was cured in air at 0.7 J/cm$^2$ using a medium pressure 200 watts per inch mercury vapor lamp.

Water absorption was determined in the manner described in Example I to be 2.2% for the coating.

Other samples were subjected to the methods described in Example I to determine the effect of accelerated aging on various properties, including glass transition temperature; tensile modulus; rupture strength; and percent elongation to break, under the following accelerated aging conditions:

(1) 125° C. for 7 days;
(2) 93.3° C., 95% relative humidity (RH) for 10 days; and
(3) 93.3° C., 95% relative humidity (RH) for 30 days.

The results are recorded below:

EXAMPLE VII

A Coating Based on a Cationically Cured Vinyl Ether-Terminated System

The following system demonstrates a composition analogous to the acrylate terminated system of Example I, but terminated with different end groups, cured via a different mechanism, and lacking components now known to be optional.

The formulation was made up as follows:

| Ingredient | Parts by Weight |
|---|---|
| aliphatic urethane oligomer with saturated hydrocarbon backbone end-capped with hydroxybutyl vinyl ether (A) | 70.00 |
| hexanediol divinyl ether (B) | 29.00 |
| (4-octyloxyphenyl) phenyl iodonium hexafluoro antimonate cationic photoinitiator (C) | 1.00 |

A six mil coating of the above composition was applied to glass using a Bird applicator and was cured in air in 10 passes, each using a medium pressure 200 watts per inch mercury vapor ultraviolet lamp at a UV dose of 0.7 J/cm$^2$.

The resulting cured films were subjected to the water absorption determination method of Example I. A value of 1.99% was determined.

Other samples were subjected to the methods detailed in Example I to determine the effects of accelerated aging on thermal, oxidative and hydrolytic stability as measured by tensile modulus; rupture strength; and percent elongation at break under the following accelerated aging conditions:

(1) 93.3° C. for 10 days;
(2) 93.3° C., 95% relative humidity (RH) for 10 days;

(3) 93.3° C. for 30 days; and
(4) 93.3° C., 95% relative humidity (RH) for 30 days.
The results are recorded below:

|  | Initial | 93.3° C., 10 days | 93.3° C. 95% RH, 10 days | 93.3° C., 30 days | 93.3%, 95% RH, 30 days |
|---|---|---|---|---|---|
| 2.5% tensile Modulus, 85° C. (psi) | 1554 | 1574 | 1329 | 1317 | 1215 |
| Instron tensile Modulus, % change (at 85° C.) | — | 1.3 | −14.5 | −15.3 | −21.8 |
| Weight change, % | — | −2.93 | −0.36 | −3.79 | 0.98 |
| % elongation at break | 26.0 | 25.8 | 33.7 | 38.1 | 33.4 |
| Rupture stength (psi) | 1095 | 1077 | 906 | 1046 | 852 |
| Rupture strength, % change | — | −1.6 | −17.3 | −4.5 | −22.2 |

These data show very low water absorption and very good performance under accelerated aging conditions.

EXAMPLE VIII

A Secondary Coating for Optical Fibers

A radiation-curable, secondary coating composition was made up as follows:

| Ingredient | Parts by Weight |
|---|---|
| Aliphatic urethane acrylate oligomer with polyester/ polyether backbone, in 25% (based on weight of oligomer and solvent only) hexanediol diacrylate solvent (solvent only is optional) (I) | 82.00 |
| Isobornyl acrylate (II) | 13.00 |
| hydroxycyclohexylphenyl ketone photoinitiator (III) | 4.00 |
| thiodiethylene bis (3,5-di-tert-butyl-4'-hydroxy) hydrocinnamate stabilizer* | 1.00 1.00 |

A six mil coating of the above composition was applied to a glass plate using a Bird applicator. The coating was cured in air at 0.7 J/cm² using a medium pressure 200 watts per inch mercury vapor lamp. The resulting film of the secondary coating exhibited a tensile modulus of about 103,700 psi, a water absorption value of about 1 68% and a cured film refractive index of about 1.506. The cure speed, as determined by a modulus versus dose curve, was determined to be about 0.3 J/cm². The UV transmission of the uncured coating was determined to be about 73% by calculating the ratio of the light transmission of a 1 mm quartz slide containing a 1 mil coating of the uncured composition to that of the slide without the coating on it.

Weight change and Instron tensile modulus change (here measured at 85° C.) was measured under the same conditions as in Example I and recorded to be as follows. Again, excellent hydrolytic and thermal stability was observed.

|  | 125° C., 7 days | 93.3° C. 10 days | 93.3° C. 30 days | 93.3° C., 95% relative humidity, 10 days | 93.3° C., 95% relative humidity, 30 days |
|---|---|---|---|---|---|
| weight change | −4.60% | −3.91% | −4.30% | −0.85% | −1.10% |
| Instron tensile modulus change (at 85° C.) | +17.2% | +18.3% | +34.3% | +4.3% | −23.9% |

EXAMPLE IX

Another Secondary Coating for Optical Fibers

A secondary coating identical to that of Example VIII, except for containing 14.00% isobornyl acrylate and no optional stabilizer, was formulated. The coating, when applied to glass and cured as above, had good tensile properties, cure speed, water absorption, UV transmission and stability, but yellowed on dry age testing.

EXAMPLE X

A Coating Having a High Tg and High Crosslink Density

A coating composition was formulated as follows:

| Ingredient | Parts by Weight |
|---|---|
| aliphatic urethane acrylate oligomer with polyester backbone (I) (used as a mixture containing 12% hexanediol acrylate) | 60.00 |
| dipentaerythritol monohydroxy pentaacrylate | 15.00 |
| a mixture of linear C₁₄ and C₁₅ diol diacrylates (II) | 10.00 |
| isobornyl acrylate (II) | 11.00 |
| hydroxycyclohexylphenyl ketone photoinitiator (III) | 4.00 |

The aliphatic urethane acrylate oligomer (I) is believed to have imparted good properties. Formulations such as the above perform well on thermal, oxidative, and hydrolytic aging tests, with almost no yellowing characteristics. The oligomer (I), as available commercially, cures to a lower modulus than the oligomer used in Example VII in solution.

The mixture of $C_{14}$ and $C_{15}$ diol diacrylates was used as a viscosity adjuster in conjunction with the isobornyl acrylate.

The above formulation was applied to glass as a 6 mil coating using the coating technique of Example I, and UV-cured. It had a high Tg and high crosslink density as compared to the coating of Example VII.

A similar formulation was prepared, but incorporating about 0.5 parts by weight of a 50:50 mixtures of bis (2,4-di-t-butylphenyl) pentaerythritol phosphite and thiodiethylene bis (3,5-di-t-butyl-4hydroxy) hydrocinnamate, as a stabilizer package. On evaluation, hydrolytic stability deteriorated, probably because of the use of the phosphite. This is undesirable for optical fiber coatings, but is not a problem for many other coating applications. When the hindered phenol is used as above as the stabilizer at the 1% level, hydrolytic stability is again acceptable for optical fiber coating use.

EXAMPLE XI

A Further Secondary Coating Formulation

The following coating composition was prepared:

| Ingredient | Parts by Weight |
|---|---|
| aliphatic urethane acrylate oligomer with polyester backbone (I) | 59.50 |
| dipentaerythritol monohydroxy pentaacrylate | 14.50 |
| isobornyl acrylate (II) | 11.00 |
| a mixture of linear $C_{14}$ and $C_{15}$ diol diacrylates (II) | 10.00 |
| hydroxycyclohexylphenyl ketone photoinitiator (III) | 4.00 |
| thiodiethylene bis (3,5-di-tert-butyl-4-hydroxy) hydrocinnamate stabilizer* | 1.00 |

This coating composition exhibited a slightly slower curing rate than the formulation of Example VII, based on cure speed versus modulus data. This data may have given a false impression because of the high Tg and high crosslink density of this coating. However, the hydrolytic aging properties of this coating, while good, were not quite as good as those of the Example VIII coating. Its viscosity and room temperature moduli were similar to those of the Example VIII formulation. Its properties overall are such that it is an acceptable secondary coating for glass optical fibers.

EXAMPLE XII

A Secondary Coating Formulation Containing Polyether-based Urethane Acrylate Oligomers The following coating composition was prepared:

| Ingredient | Parts by Weight |
|---|---|
| First aliphatic urethane acrylate oligomer with polyether backbone having an acrylate functionality of 2.6 (I) | 34.00 |
| Second aliphatic urethane acrylate oligomer with polyether backbone having a lower acrylate functionality than above (2.4) (I) | 34.00 |
| Hexanediol diacrylate (II) | 13.98 |
| Isobornyl acrylate (II) | 13.00 |
| Hydroxycyclohexylphenyl ketone photoinitiator (III) | 4.00 |
| Thiodiethylene bis (3,5-di-tert-butyl-4-hydroxy) hydrocinnamate stabilizer* | 1.00 |
| Surface tension adjustment additive* | 0.02 |

This coating composition, before cure, had the following temperature/viscosity profile, measured using a Brookfield viscometer, model LVT, 6 rpm, #34 spindle: 5430 cps at 25° C.; 4310 cps at 28° C.; 3440 cps at 30° C.; 2310 cps at 35° C.; and 1520 cps at 40° C. The liquid composition had a refractive index of 1.4856 at 24.6° C. and a density of 8.89 lb/gal (1.07 g/cc).

A 6 mil coating of the composition was cast and cured as in previous Examples. The cured film of this Example had a rupture strength of 3812 psi; elongation at break of 26.7%; TGA volatiles content of 4.78%; oxidative induction temperature of 210° C.; and cured film refractive index of 1.5060 at 24.6° C. Its cure speed was determined to be 0.4 J/cm². The 2.5% tensile modulus of the coating was 90,528 psi at 25° C. and 4070 psi at 85° C. A water absorption value of 1.59% was measured in the manner described in Example I, after a 24 hour soak.

Other samples of this coating were tested under the following accelerated aging conditions:
(1) 125° C. for 7 days;
(2) 93.3° C. for 10 days;
(3) 93.3° C. for 10 days at 95% RH;
(4) 93.3° C. for 30 days; and
(5) 93.3° C. for 30 days at 95% RH.

The following properties were observed for the cured coating described in this Example:

| | 125° C. 7 days | 93.3° C., 10 days | 93.3° C. 10 days 95% RH | 93.3° C., 30 days | 93.3° C., 30 days 95% RH |
|---|---|---|---|---|---|
| weight change | −4.42 | −4.22 | −0.88 | −4.26 | −2.42 |
| 2.5% mod. at 25° C. (psi) | 124,633 | 122,136 | 88,281 | 122,522 | 97,850 |
| 2.5% tensile modulus change (%) at 25° C. | 36.1 | 33.4 | −3.6 | 33.8 | 6.9 |
| 2.5% mod. at 85° C. (psi) | 4208 | 4343 | 3705 | 4408 | 3466 |
| 2.5% modulus change (%) at 85° C. | 3.0 | 6.3 | −9.3 | 7.9 | −15.2 |
| rupture strength (psi) | 4868 | 4362 | 3981 | 4535 | 3823 |
| percent elongation at break | 30.7 | 25.8 | 30.0 | 30.3 | 21.8 |

EXAMPLE XIII

Another Secondary Coating Formulation Containing Two Polyether-based Urethane Acrylate Oligomers The following coating composition was prepared:

| Ingredient | Parts by Weight |
|---|---|
| First aliphatic urethane acrylate oligomer with polyether backbone having an acrylate functionality of 2.6 | 34.00 |
| Second aliphatic urethane acrylate oligomer with polyether backbone having an acrylate functionality of 2.4 (I) | 34.00 |
| Hexanediol diacrylate (II) | 13.99 |
| Isobornyl acrylate (II) | 13.00 |
| Hydroxycyclohexylphenyl ketone photoinitiator (III) | 4.00 |
| Thiodiethylene bis (3,5-di-tert-butyl-4-hydroxy) hydrocinnamate stabilizer* | 1.00 |
| Surface tension adjustment additive* | 0.01 |

The uncured coating of this Example had a refractive index of 1.4856 at 24.2° C. and a viscosity of 5320 cps at 25° C.

A 6 mil coating was cast and cured as in previous Examples to produce a cured film having a oxidative induction temperature of 194° C. and a cure ratio (ratio of 2.5% moduli at 25° C. when cured in air at 0.2 J/cm² and at 0.7 J/cm², respectively) of 100.9%.

The coating, which is very similar to that of the previous Example, is expected to perform equally well on long term aging.

CONCLUSION

Optical glass fibers coated with the primary and secondary coatings of the present invention have been designed to possess several important qualities rendering the coated fibers useful for many applications and particularly suitable in local area networks for fiber-to-the-home uses.

It has now been discovered that virtually any chemistry which is capable of reacting together certain specific functional backbones and which does not adversely effect the properties of the composition when cured, may be used to formulate a composition possessing these qualities.

The primary coatings, when cured, possess a refractive index greater than that of the underlying fiber (i.e., about 1.48), a tensile modulus of less than about 500 psi and a glass transition temperature of less than about −20° C., and preferably less than about −30° C. The primary coatings are sufficiently hydrophobic to resist moisture penetration and consequent hydrolysis of the underlying optical fibers; have a sufficiently low tensile modulus to cushion and protect the fibers; and a sufficiently low glass transition temperature in the use range of the fibers.

The secondary coatings after cure function as a hard, protective layer having a glass transition temperature of about 50° C. and a tensile modulus of over 40,000 psi, preferably about 100,000 psi. Furthermore, the secondary coatings are resistant to moisture and have an appropriate coefficient of friction for their desired use. The secondary coatings have a coefficient of friction allowing the coated fibers to slide easily along each other while staying aligned on a spool.

Both the primary and secondary coatings have suitable viscosities for coating and, when cured, contain minimal quantities of unbound reactants (volatiles) and have good shelf life characteristics.

The present invention permits the production of coating formulations meeting these criteria, and the manufacture of coated optical fibers well suited for use in fiber-to-the-home applications, though there are many uses for coatings that are prepared in accordance with the invention, that do not have to meet the stringent requirements imposed on optical fiber coatings.

It has now been discovered that an optimized composition can be formulated having the above properties by using the backbones of the components described herein and in the parent application, but that any end groups capable of reacting, via free radical initiation, cationic cure or other method, may be employed. It was also discovered that, in connection with the present invention, a coating formulated in the absence of a silane adhesion promoter and a refractive index modifier, and, in some cases, a photoinitiator, all believed in the parent application to be essential in all embodiments, could in some instances be satisfactory.

Thus, useful coatings for many purposes may be formulated, an exemplary preferred primary coating comprising:

(A) a reactively terminated urethane oligomer which is the reaction product of (i) a hydrocarbon polyol, the hydrocarbon portion of which is from about 500 to about 4,000 molecular weight; (ii) an aliphatic polyisocyanate; and (iii) an endcapping monomer capable of supplying a reactive terminus;

(B) a low Tg, soft curing, hydrocarbon monomer comprising a terminus reactive with (A); and (C) a photoinitiator, which is required unless a system other than a non ultraviolet-cured free radical system is used, with one or more of the following optional components:

(D) a crosslinking agent capable of helping to coreact multifunctional systems;

(E) a stabilizer or antioxidant that imparts added shelf life and storage stability to the coating composition;

(F) an organofunctional silane adhesion promoter capable of preventing delamination under conditions of high humidity and high temperature;

(G) a chain transfer agent comprising a hydrocarbon chain having at least eight carbons in its hydrocarbon chain; and (H) a component capable of increasing the refractive index of the composition.

The combination of (B) and (C) with (A) has the effect of producing a coating of mutually compatible ingredients, that is radiation-curable.

In preferred embodiments, the (A) component may be acrylate, thiol or vinyl ether terminated.

In another preferred embodiment, the (B) component comprises from about 10 percent to about 90 percent by weight (based on the total weight of (A) and (B)) of the coating and is a hydrocarbon monomer containing between 6 and 18 carbon atoms, and the glass transition temperature of the cured coating containing it is preferably −20° C. or less. In yet another preferred embodiment, (B) may be a reactively terminated compound such as lauryl acrylate, decane dithiol or hexanediol divinyl ether.

The composition may be, in one embodiment, used as a primary coating for an optical fiber, the coating having a cured tensile modulus of less than 500 psi (at room temperature, based on a 6 mil thick film).

A useful, exemplary coating for use as a secondary coating for an optical fiber comprises a reactively terminated aliphatic urethane oligomer based on a polyester and/or polyether; a hydrocarbonaceous viscosity-adjusting component reactive with that oligomer; and an optional photoinitiator.

In other embodiments, compositions of this kind can be formulated to be useful as interlayers for laminated safety glass, and as coatings for electronic devices such as photocells and photoswitches, for example.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A radiation-curable primary coating composition for an optical fiber comprising (A) from about 10 percent to about 90 percent by weight of a reactively terminated urethane oligomer which is the reaction product of (i) a hydrocarbon polyol, the hydrocarbon portion of which is fully or partially hydrogenated and has a weight average molecular weight of from about 500 to about 4,000; (ii) a wholly aliphatic polyisocyanate; and (iii) an endcapping monomer supplying a reactive terminus;

(B) from about 10 percent to about 90 percent by weight of a hydrocarbon monomer containing between 6 and 20 carbon atoms which is terminated with at least one end group reactive with the reactive terminus of (A); and (C) optionally, from about 0.05 percent to about 10.0 percent by weight of photoinitiator, wherein all of the stated percentages are percentages by weight based on the total weight of (A), (B), and (C), wherein the tensile modulus of the coating composition, when cured, is less about 500 psi at 25° C., and wherein the refractive index of the cured coating composition is 1.48 or higher.

2. A radiation-curable primary coating composition for an optical fiber according to claim 1 wherein said oligomer (A) is terminated with a terminus selected from the group consisting of acrylic, methacrylic, vinylic, allylic, itaconic, crotonic, styrenic, acrylamide, norbornenyl, acetylenic, epoxy, mercapto, amino and mixtures thereof.

3. A radiation-curable primary coating composition for an optical fiber according to claim 1 wherein said hydrocarbon polyol (i) is selected from the group consisting of fully or partially hydrogenated 1,2-polybutadiene polyol; 1,2-polybutadiene polyol hydrogenated to an iodine number of from 9 to 21; fully or partially hydrogenated polyisobutylene polyol; polybutene polyol; hydrogenated dimer diol; and mixtures thereof.

4. A radiation-curable primary coating composition for an optical fiber according to claim 1 wherein said organic polyisocyanate (ii) is selected from the group consisting of isophorone diisocyanante; dicyclohexylmethane-4, 4'-diisocyanante; hexamethylene diisocyanate; and trimethylhexamethylene diisocyanate.

5. A radiation-curable primary coating composition for an optical fiber according to claim 1 wherein said oligomer (A) is endcapped with an hydroxyalkyl vinyl ether.

6. A radiation-curable primary coating composition for an optical fiber according to claim 5 wherein said ether is hydroxybutyl vinyl ether.

7. A radiation-curable primary coating composition for an optical fiber according to claim 1 wherein said oligomer (A) is endcapped with allyl ether.

8. A radiation-curable primary coating composition for an optical fiber according to claim 1 wherein said oligomer (A) is characterized by the formula

where
R$^1$ is a linear or branched hydrocarbon polymer of from 500 to 4,000 molecular weight selected from the group consisting of fully or partially hydrogenated 1,2-polybutadiene; 1,2-polybutadiene hydrogenated to an iodine number of from 9 to 21; fully or partially hydrogenated polyisobutylene; polybutene polyol; and hydrogenated dimer diol;

R$^2$ is a linear, branched or cyclic alkylene of from six to twenty carbon atoms; and X and Q are independently either (a) a radical or the formula:

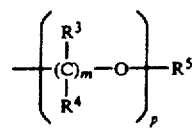

wherein R$^5$ is selected from the group consisting of acrylic, methacrylic, vinylic, allylic, itaconic, crotonic, styrenic, acrylamide, norbornenyl, acetylenic, epoxy, mercapto and amino; R$^3$ and R$^4$ are independently hydrogen, methyl, ethyl or propyl; m is an integer from 1 to 10; and p is either zero or one, or (b) a saturated alkyl radical of from nine to twenty carbon atoms, with the proviso that said oligomer must possess at least one reactive terminal group.

9. A radiation-curable primary coating composition according to claim 1 wherein said monomer (B) is selected from the group consisting of hexyl acrylate; hexyl methacrylate; 2-ethylhexyl acrylate; 2-ethylhexyl methacrylate; octyl acrylate; octyl methacrylate; isooctyl acrylate; isooctyl methacrylate; decyl acrylate; decyl methacrylate; isodecyl acrylate; isodecyl methacrylate; lauryl acrylate; lauryl methacrylate; stearyl acrylate; stearyl methacrylate; C$_{14}$–C$_{15}$ hydrocarbon diol diacrylates; C$_{14}$–C$_{15}$ hydrocarbon diol dimethacrylates; tridecyl acrylate; tridecyl methacrylate; palmitic acrylate; palmitic methacrylate; 1,10-decane dithiol; hexanediol divinyl ether; mercaptoacetate esters; mercaptopropionate esters; lauryl vinyl ether; ethylhexylvinyl ether; isodecyl vinyl ether; butanediol divinyl ether; cyclohexanedimethanol divinyl ether; C$_{14}$–C$_{15}$ diol divinyl ethers; and mixtures thereof.

10. A radiation-curable primary coating composition according to claim 1 additionally comprising from about 1.0 percent to about 50.0 percent by weight, based on total weight of (A), (B) and (C), of a crosslinking agent (D) distinct from (A), (B) and (C).

11. A radiation-curable primary coating composition according to claim 10 wherein said crosslinking agent (D) comprises trimethylol ethane trivinyl ether and is distinct from (A), (B) and (C).

12. A radiation-curable primary coating composition according to claim 1 additionally comprising from about 0.0001 percent to about 3.0 percent by weight, based on total weight of (A), (B) and (C), of a stabilizer (E).

13. A radiation-curable primary coating composition according to claim 12 wherein said stabilizer (E) is selected from the group consisting of diethyl hydroxylamine; organic phosphites; hindered phenols; trihexylamine; octadecyl-3-(3', 5'-di-tert-butyl-4'-hydroxy phenyl) propionate; thiodiethylene bis (3,5-di-tert-butyl-4-hydroxy) hydrocinnamate; butylated paracresol-dicyclopentadiene copolymer; tetrakis [methylene (3,5-di-tert-butyl-4-hydroxyhydrocinnamate)]methane; 3-aminopropyltrimethoxy silane; and mixtures thereof.

14. A radiation-curable primary coating composition according to claim 1 additionally comprising from about 0.1 percent to about 3.0 percent by weight, based on total weight of (A), (B) and (C), of an organofunctional silane adhesion promoter (F).

15. A radiation-curable primary coating composition according to claim 14 wherein said silane adhesion promoter (F) is selected from the group consisting of amino-functional silanes; mercapto-functional silanes; acrylate-functional silanes; methacrylate-functional silanes; acrylamido-functional silanes; allyl-functional silanes; vinyl-functional silanes; and mixtures thereof.

16. A radiation-curable primary coating composition according to claim 14 wherein said silane adhesion promoter (F) is selected from the group consisting of mercaptoalkyl trialkoxy silane; methacryloxyalkyl trialkoxy silane; aminoalkyl trialkoxy silane; vinyl trialkoxy silane; and mixtures thereof.

17. A radiation-curable primary coating composition according to claim 1 wherein said silane adhesion promoter (F) is gamma-mercaptopropyl trimethoxy silane.

18. A radiation-curable primary coating composition for an optical fiber according to claim 1 wherein said photoinitiator (C) is selected from the group consisting of hydroxymethylphenyl propanone; hydroxycyclohexylphenyl ketone; dimethoxyphenyl acetophenone; 2-methyl-1, 4-(methyl thio) phenyl-2-morpholinopropane-1; 1-(4-isopropylphenyl)-2-hydroxy-2-methyl-propan-1-one; 1-(4-dodecylphenyl)-2-hydroxy-2-methylpropan-1-one; 4-(2-hydroxyethoxy)phenyl-2(2-hydroxy-2-propyl) ketone; diethoxyacetophenone; 2,2-di-sec-butoxyaceto-phenone; diethoxyphenyl acetophenone; (4-octyloxyphenyl) phenyl iodonium hexafluoro antimonate; (4-octyloxyphenyl) diphenyl sulfonium hexafluoro antimonate; (4-decyloxyphenyl) phenyl iodonium hexafluoro antimonate; (4-otadecyloxyphenyl) phenyl iodonium hexafluoro antimonate; and mixtures thereof.

19. A radiation-curable primary coating composition for an optical fiber according to claim 1 wherein said photoinitiator (E) is hydroxymethylphenyl propanone.

20. A radiation-curable primary coating composition for an optical fiber according to claim 1 wherein said photoinitiator (E) is (4-octyloxyphenyl) phenyl iodonium hexafluoro antimonate.

21. A radiation-curable primary coating composition for an optical fiber according to claim 1 additionally comprising from about 0.1 percent to about 10 percent by weight, based on total weight of (A), (B) and (C), of a mercapto functional chain transfer agent (H).

22. A radiation-curable primary coating composition according to claim 1 additionally comprising from about 5 percent to about 60 percent by weight, based on total weight of (A), (B) and (C), of a monomer or oligomer (G) which is capable of increasing the refractive index relative to that of a composition containing only (A), (B) and (C).

23. A radiation-curable primary coating composition according to claim 22 wherein said monomer or oligomer (G) comprises (i) an aromatic moiety; (ii) a moiety providing a reactive terminus; and (iii) a hydrocarbon moiety.

24. A radiation-curable primary coating composition according to claim 22 wherein said monomer or oligomer (G) is selected from the group consisting of polyalkylene glycol nonylphenyl ether acrylates; polyalkylene glycol nonylphenyl ether methacrylates; and mixtures thereof.

25. A radiation-curable primary coating composition for an optical fiber, comprising
(A) from about 30 percent to about 70 percent by weight of an aliphatic vinyl ether urethane oligomer having as a backbone a hydrogenated 1,2-polybutadiene polymer;
(B) from about 5 percent to about 40 percent by weight of 1,10-decane dithiol;
(C) from about 2 percent to about 10 percent by weight of hydroxymethyl phenyl propanone photoinitiator;
(D) from about 1 percent to about 20 percent by weight of trimethylol ethane trivinyl ether crosslinking agent; and
(E) from about 0.001 percent to about 0.1 percent by weight of diethyl hydroxyl amine stabilizer,
wherein all of the stated percentages are percentages by weight based upon total weight of (A), (B), and (C).

26. A radiation curable primary coating composition according to claim 25 additionally comprising (F) from about 0.3 percent to about 1.0 percent by weight of gamma-mercaptopropyl trimethoxy silane adhesion promoter.

27. A radiation-curable primary coating composition for an optical fiber, comprising
(A) from about 20 percent to about 80 percent by weight of an aliphatic vinyl ether-terminated urethane oligomer having as a backbone an hydrogenated 1,2-polybutadiene polymer;
(B) from about 5 percent to about 80 percent by weight of hexanediol divinyl ether; and
(C) from about 0.05 percent to about 5.0 percent by weight of (4-octyloxyphenyl) phenyl iodonium hexafluoro antimonate cationic cure initiator,
wherein all of the stated percentages are percentages by weight based upon total weight of (A), (B) and (C).

28. A radiation curable primary coating composition according to claim 27 additionally comprising (D) from about 0.3 percent to about 1.0 percent by weight of a silane adhesion promoter selected from the group consisting of mercapto-functional silanes; vinyl-functional silanes; acrylate-functional silanes; methacrylate-functional silanes; epoxy-functional silanes; and mixtures thereof.

29. A radiation-curable coating composition for the surface of an optically useful article comprising
(A) from about 10 percent to about 90 percent by weight of a reactively terminated urethane oligomer which is the reaction product of (i) a hydrocarbon polyol, the hydrocarbon portion of which is fully or partially hydrogenated and has a weight average molecular weight of from about 500 to about 4,000; (ii) a wholly aliphatic polyisocyanate; and (iii) an endcapping monomer supplying a reactive terminus;
(B) from about 10 percent to about 90 percent by weight of a hydrocarbon monomer containing between 6 and 20 carbon atoms which is terminated with at least one end group reactive with the reactive terminus of (A);
(C) optionally, from about 0.05 percent to about 10.0 percent by weight of a photoinitiator;
(F) from about 0.1 percent to about 3.0 percent by weight of an organofunctional silane adhesion promoter; and
(G) from about 5 percent to about 60 percent by weight of a monomer or oligomer which is capable of increasing the reactive index relative to that of a composition containing only (A), (B) and (C),
wherein all of the stated percentages are percentages by weight based on total weight of (A), (B), and (C).
wherein the tensile modulus of the coating composition, when cured, is less about 500 psi at 25° C.,
and wherein the refractive index of the cured coating composition is 1.48 or higher.

30. A radiation-curable coating composition for the surface of an optically useful article according to claim 29 wherein said oligomer (A) is terminated with a terminus selected from the group consisting of acrylic, methacrylic, vinylic, allylic, itaconic, crotonic, styrenic, acrylamide, norbornenyl, acetylenic, epoxy, mercapto, amino and mixtures thereof.

31. A radiation-curable coating composition for the surface of an optically useful article according to claim 29 wherein said hydrocarbon polyol (i) is selected from the group consisting of fully or partially hydrogenated 1,2-polybutadiene polyol; 1,2-polybutadiene polyol hydrogenated to an iodine number of from 9 to 21; fully or partially hydrogenated polyisobutylene polyol; polybutene polyol; hydrogenated dimer diol; and mixtures thereof.

32. A radiation-curable coating composition for the surface of an optically useful article according to claim 29 wherein said organic polyisocyanate (ii) is selected from the group consisting of isophorone diisocyanante; dicyclo- hexylmethane-4, 4'-diisocyanante; hexamethylene diisocyanate; and trimethylhexamethylene diisocyanate.

33. A radiation-curable coating for the surface of an optically useful article according to claim 29 wherein said oligomer (A) is endcapped with an hydroxyalkyl vinyl ether.

34. A radiation-curable coating for the surface of an optically useful article according to claim 29 wherein said ether is hydroxybutyl vinyl ether.

35. A radiation-curable coating for the surface of an optically useful article according to claim 29 wherein said oligomer (A) is endcapped with allyl ether.

36. A radiation-curable coating for the surface of an optically useful article according to claim 29 wherein said oligomer (A) is characterized by the formula

where $R^1$ is a linear or branched hydrocarbon polymer of from about 500 to about 4,000 molecular weight selected from the group consisting of fully or partially hydrogenated 1,2-polybutadiene; 1,2-polybutadiene hydrogenated to an iodine number of from 9 to 21; fully or partially hydrogenated polyisobutylene; polybutene polyol; and hydrogenated dimer diol;

$R^2$ is a linear, branched or cyclic alkylene of from six to twenty carbon atoms; and X and Q are independently either (a) a radical or the formula:

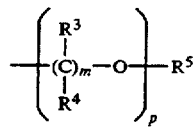

wherein $R^5$ is selected from the group consisting of acrylic, methacrylic, vinylic, allylic, itaconic, crotonic, styrenic, acrylamide, norbornenyl, acetylenic, epoxy, mercapto and amino; $R^3$ and $R^4$ are independently hydrogen, methyl, ethyl or propyl; m is an integer from 1 to 10; and p is either zero or one, or (b) a saturated alkyl radical of from nine to twenty carbon atoms, with the proviso that said oligomer must possess at least one reactive terminal group.

37. A radiation-curable coating composition for the surface of an optically useful article according to claim 29 wherein said monomer (B) is selected from the group consisting of hexyl acrylate; hexyl methacrylate; 2-ethylhexyl acrylate; 2-ethylhexyl methacrylate; octyl acrylate; octyl methacrylate; isooctyl acrylate; isooctyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; 1, 10-decane dithiol; hexanediol divinyl ether; mercaptoacetate esters; mercaptopropionate esters; lauryl vinyl ether, ehtylhexylvinyl ether; isodecyl vinyl ether; butanediol divinyl ether; cyclohexanedimethanol divinyl ether; $C_{14}$–$C_{15}$ diol divinyl ethers; stearyl acrylate; stearyl methacrylate; $C_{14}$–$C_{15}$ hydrocarbon diol diacrylates; $C_{14}$–$C_{15}$ hydrocarbon diol dimethacrylates; and mixtures thereof.

38. A radiation-curable coating composition for the surface of an optically useful article according to claim 29 additionally comprising from about 1.0 percent to about 50.0 percent by weight, based on total weight of (A), (B) and (C), of a crosslinking agent (D) distinct from (A), (B) and (C).

39. A radiation-curable coating composition for the surface of an optically useful article according to claim 29 wherein said crosslinking agent (D) comprises trimethylol ethane trivinyl ether and is distinct from (A), (B) and (C).

40. A radiation-curable coating composition for the surface of an optically useful article according to claim 29 additionally comprising from about 0.0001 percent to about 3.0 percent by weight, based on total weight of (A), (B) and (C), of a stabilizer (E).

41. A radiation-curable coating for the surface of an optically useful article according to claim 40 wherein said stabilizer (E) is selected from the group consisting of diethyl hydroxylamine; organic phosphites; hindered phenols; trihexylamine; octadecyl-3-(3',5'-di-tert-butyl-4'-hydroxy phenyl) propionate; thiodiethylene bis (3,5-ditert-butyl-4-hydroxy) hydrocinnamate; butylated paracresol-dicyclopentadiene copolymer; tetrakis [methylene (3,5-di-tert-butyl-4-hydroxyhydrocinnamate)]methane; 3-aminopropyltrimethoxy silane; and mixtures thereof.

42. A radiation-curable coating composition for the surface of an optically useful article according to claim 29 wherein said silane adhesion promoter (F) is selected from the group consisting of amino-functional silanes; mercapto-functional silanes; acrylate-functional silanes; methacrylate-functional silanes; acrylamido-functional silanes; allyl-functional silanes; vinyl-functional silanes; and mixtures thereof.

43. A radiation-curable coating composition for the surface of an optically useful article according to claim 29 wherein said silane adhesion promoter (F) is selected from the group consisting of mercaptoalkyl trialkoxy silane; methacryloxyalkyl trialkoxy silane; aminoalkyl trialkoxy silane; vinyl trialkoxy silane; and mixtures thereof.

44. A radiation-curable coating composition for the surface of an optically useful article according to claim 42 wherein said silane adhesion promoter (F) comprises gamma-mercaptopropyl trimethoxy silane.

45. A radiation-curable coating composition for the surface of an optically useful article according to claim wherein said photoinitiator (C) is selected from the group consisting of hydroxymethylphenyl propanone; hydroxycyclohexylphenyl ketone; dimethoxyphenyl acetophenone; 2-methyl-1, 4-(methyl thio) phenyl-2-morpholino-propane-1; 1-(4-isopropyl-phenyl)-2-hydroxy-2-methyl-propan-1-one; 1-(4-dodecylphenyl)-2-hydroxy-2-methylpropan-1-one;4-(2-hydroxyethoxy)-phenyl-2(2-hydroxy-2-propyl) ketone; diethoxyacetophenone; 2,2-di-sec-butoxyacetophenone; diethoxyphenyl acetophenone; (4-octyloxyphenyl) phenyl iodonium hexafluoro antimonate; (4-octyloxyphenyl) diphenyl sulfonium hexafluoro antimonate; (4-decyloxyphenyl) phenyl iodonium hexafluoro antimonate; (4-otadecyloxyphenyl) phenyl iodonium hexafluoro antimonate; and mixtures thereof.

46. A radiation-curable coating composition for the surface of an optically useful article according to claim 29 wherein said photoinitiator (C) comprises hydroxymethylphenyl propanone.

47. A radiation-curable coating composition for the surface of an optically useful article according to claim 29 wherein said photoinitiator (C) comprises (4-octyloxyphenyl) phenyl iodonium hexafluoro antimonate.

48. A radiation-curable coating for the surface of an optically useful article according to claim 29 additionally comprising from about 0.1 percent to about 10 percent by weight, based on total weight of (A), (B) and (C), of a mercapto functional chain transfer agent (H).

49. A radiation-curable coating composition for the surface of an optically useful article according to claim 29 wherein said monomer or oligomer (G) comprises (i) an aromatic moiety;
(ii) a moiety providing a reactive terminus; and
(iii) a hydrocarbon moiety.

50. A radiation-curable coating composition for the surface of an optically useful article according to claim 29 wherein said monomer or oligomer (G) is selected from the group consisting of polyalkylene glycol nonylphenyl ether acrylates; polyalkylene glycol nonylphenyl ether methacrylates; and mixtures thereof.

* * * * *